(12) United States Patent
Nakagawa et al.

(10) Patent No.: US 11,705,260 B2
(45) Date of Patent: Jul. 18, 2023

(54) MAGNETIC DEVICE INCLUDING WINDING AND INSULATORS, AND POWER CONVERSION DEVICE USING THE SAME

(71) Applicant: PANASONIC INTELLECTUAL PROPERTY MANAGEMENT CO., LTD., Osaka (JP)

(72) Inventors: Yoshitake Nakagawa, Osaka (JP); Takehiko Yamakawa, Osaka (JP); Motohiko Fujimura, Osaka (JP); Akira Kato, Osaka (JP); Kazuyuki Sakiyama, Osaka (JP)

(73) Assignee: PANASONIC INTEI LECTUAL PROPERTY MANAGEMENT CO., LTD., Osaka (JP)

( * ) Notice: Subject to any disclaimer, the term of this patent is extended or adjusted under 35 U.S.C. 154(b) by 379 days.

(21) Appl. No.: 16/942,480

(22) Filed: Jul. 29, 2020

(65) Prior Publication Data

US 2020/0357549 A1 Nov. 12, 2020

Related U.S. Application Data

(62) Division of application No. 15/173,700, filed on Jun. 5, 2016, now abandoned.

(30) Foreign Application Priority Data

Jun. 12, 2015 (JP) .................................. 2015-119386

(51) Int. Cl.
*H01F 5/02* (2006.01)
*H01F 5/06* (2006.01)
(Continued)

(52) U.S. Cl.
CPC ................. *H01F 5/02* (2013.01); *H01F 5/06* (2013.01); *H01F 27/325* (2013.01);
(Continued)

(58) Field of Classification Search
CPC .... H01F 2005/025; H01F 27/325; H01F 5/05; H01F 5/02
(Continued)

(56) References Cited

U.S. PATENT DOCUMENTS 3,019,375 A 1/1962 Geyer
3,218,592 A 11/1965 Barrick
(Continued)

FOREIGN PATENT DOCUMENTS

AU 650301 B 6/1994
CN 1037428 A 11/1989
(Continued)

OTHER PUBLICATIONS

Non-Final Office Action issued in U.S. Appl. No. 15/173,700, dated Jul. 6, 2018.
(Continued)

*Primary Examiner* — Mang Tin Bik Lian
*Assistant Examiner* — Joselito S. Baisa
(74) *Attorney, Agent, or Firm* — McDermott Will & Emery LLP

(57) ABSTRACT

A magnetic device includes a winding, and insulators by which the winding is surrounded. Each of the insulators is in contact with the winding. A gap exists between each two adjacent of the insulators in a winding direction of the winding.

15 Claims, 16 Drawing Sheets

(51) Int. Cl.
*H01F 27/32* (2006.01)
*H02M 1/00* (2006.01)
*H02M 3/00* (2006.01)
*H02M 3/335* (2006.01)

(52) U.S. Cl.
CPC ..... *H01F 2005/025* (2013.01); *H02M 1/0058* (2021.05); *H02M 3/01* (2021.05); *H02M 3/33571* (2021.05); *H02M 3/33573* (2021.05); *Y02B 70/10* (2013.01)

(58) Field of Classification Search
USPC .......................................................... 336/222
See application file for complete search history.

(56) References Cited

U.S. PATENT DOCUMENTS

| | | | |
|---|---|---|---|
| 4,060,783 A | 11/1977 | Harnden, Jr. | |
| 4,216,455 A * | 8/1980 | Hester | H01F 41/04 336/160 |
| 4,744,763 A | 5/1988 | Suzuki et al. | |
| 4,916,424 A * | 4/1990 | Kijima | H01F 27/325 336/83 |
| 5,440,286 A | 8/1995 | Pikul et al. | |
| 5,860,207 A | 1/1999 | Knight et al. | |
| 6,078,242 A | 6/2000 | Tomita et al. | |
| 6,249,204 B1 | 6/2001 | Larranaga et al. | |
| 6,344,786 B1 | 2/2002 | Chin | |
| 6,480,085 B2 * | 11/2002 | Chiang | H01F 5/02 336/208 |
| 6,591,482 B1 | 7/2003 | Fleege et al. | |
| 6,630,880 B2 | 10/2003 | Cheung et al. | |
| 6,734,777 B2 | 5/2004 | Yeh et al. | |
| 7,429,908 B2 | 9/2008 | Pilniak | |
| 7,755,558 B2 * | 7/2010 | Ueda | H01Q 21/24 343/788 |
| 8,018,314 B2 | 9/2011 | Zeng et al. | |
| 8,022,803 B2 | 9/2011 | Park et al. | |
| 8,698,586 B2 | 4/2014 | Park et al. | |
| 8,742,878 B2 | 6/2014 | Park et al. | |
| 8,791,786 B2 | 7/2014 | Maeda et al. | |
| 8,866,577 B2 | 10/2014 | Maeda et al. | |
| 9,837,194 B1 * | 12/2017 | Folker | H01F 27/325 |
| 9,960,492 B2 * | 5/2018 | Cobos Reyes | H01Q 7/06 |
| 10,650,959 B1 * | 5/2020 | Folker | H01F 38/023 |
| 10,707,565 B2 * | 7/2020 | Navarro Pérez | H01Q 1/523 |
| 2002/0145497 A1 | 10/2002 | Yeh et al. | |
| 2007/0030109 A1 * | 2/2007 | Kohno | H01F 38/10 336/208 |
| 2008/0024262 A1 * | 1/2008 | Chang | H01F 27/02 336/198 |
| 2010/0214049 A1 * | 8/2010 | Park | H01F 27/325 336/170 |
| 2015/0248965 A1 | 9/2015 | Chou | |
| 2016/0365636 A1 * | 12/2016 | Cobos Reyes | H01Q 1/12 |
| 2017/0053733 A1 * | 2/2017 | Misaki | H01F 27/08 |

FOREIGN PATENT DOCUMENTS

| | | |
|---|---|---|
| CN | 101819864 A | 9/2010 |
| JP | S53-100523 U | 8/1978 |
| JP | S54-114012 U | 8/1979 |
| JP | S55-084925 U | 6/1980 |
| JP | 60-064418 A | 4/1985 |
| JP | 5-505910 | 8/1993 |
| JP | 2001-237125 | 8/2001 |
| JP | 2010-238842 | 10/2010 |
| JP | 2014-216373 A | 11/2014 |
| TW | 478638 U | 3/2002 |

OTHER PUBLICATIONS

Final Office Action issued in U.S. Appl. No. 15/173,700, dated Mar. 8, 2019.
Non-Final Office Action issued in U.S. Appl. No. 15/173,700, dated Sep. 10, 2019.
Final Office Action issued in U.S. Appl. No. 15/173,700, dated Apr. 29, 2020.
English Translation of Chinese Search Report dated Jul. 22, 2019 for the related Chinese Patent Application No. 201610319086.3.
English Translation of Chinese Search Report dated Jan. 3, 2019 for the related Chinese Patent Application No. 201610319086.3.

* cited by examiner

MAGNETIC DEVICE INCLUDING WINDING AND INSULATORS, AND POWER CONVERSION DEVICE USING THE SAME

CROSS-REFERENCE OF RELATED APPLICATIONS

This application is a Divisional application of U.S. patent application Ser. No. 15/173,700, filed on Jun. 5, 2016, which claims the benefit of Japanese Application No. 2015-119386, filed on Jun. 12, 2015, the entire disclosures of which Applications are incorporated by reference herein.

BACKGROUND

1. Technical Field

The present disclosure relates to a magnetic device and a power conversion device using the same.

2. Description of the Related Art

In recent years, power electronics has been attracting attention for the purpose of overcoming environmental problems and energy problems. Power conversion circuits often require high-voltage large-current operations. Consequently, securing the insulating property of transformers used in power conversion circuits and heat-dissipation measures for windings and cores are required.

Japanese Patent No. 3481541 discloses a conventional transformer in which a primary winding and a secondary winding are wound concentrically, and the windings are molded with a thermosetting insulating resin having high thermal conductivity.

SUMMARY

A magnetic device according to an aspect of the present disclosure includes a winding, and insulators by which the winding is surrounded, each of the insulators being in contact with the winding, a gap existing between each two adjacent of the insulators in a winding direction of the winding.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

First, the findings forming the basis of the present disclosure will be described.

Figure 27:
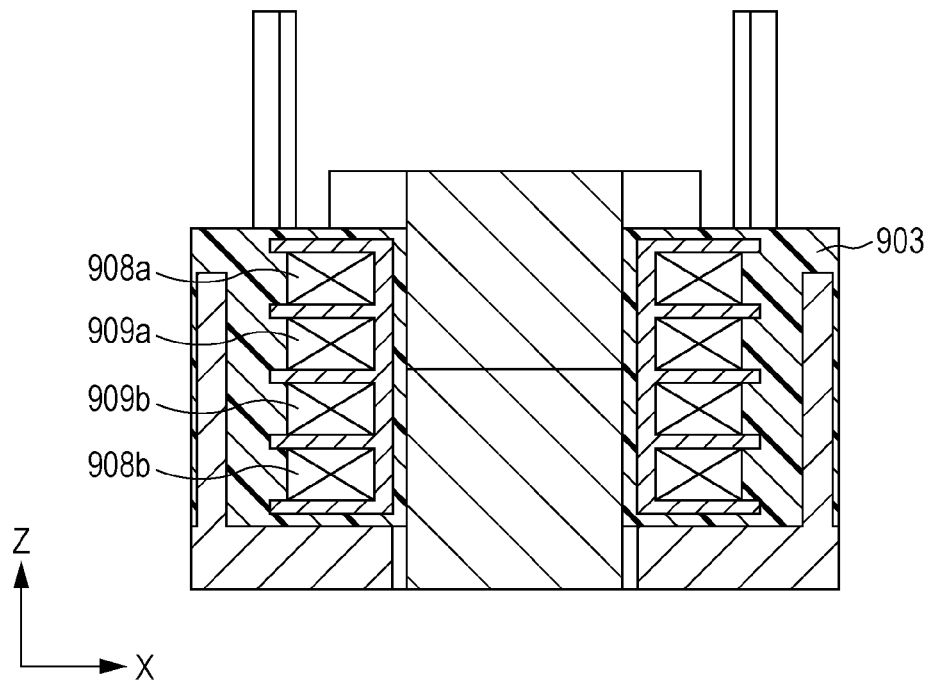
FIG. 27 is a cross-sectional view depicting the structure of a transformer of a comparative example.

FIG. 27 depicts a transformer of a comparative example. In FIG. 27, winding 908a and winding 908b are primary windings, and winding 909a and winding 909b are secondary windings. In the transformer of FIG. 27, in order to improve the heat dissipating property of these windings, these windings are molded with a sealing resin 903 having high thermal conductivity.

Figure 28:
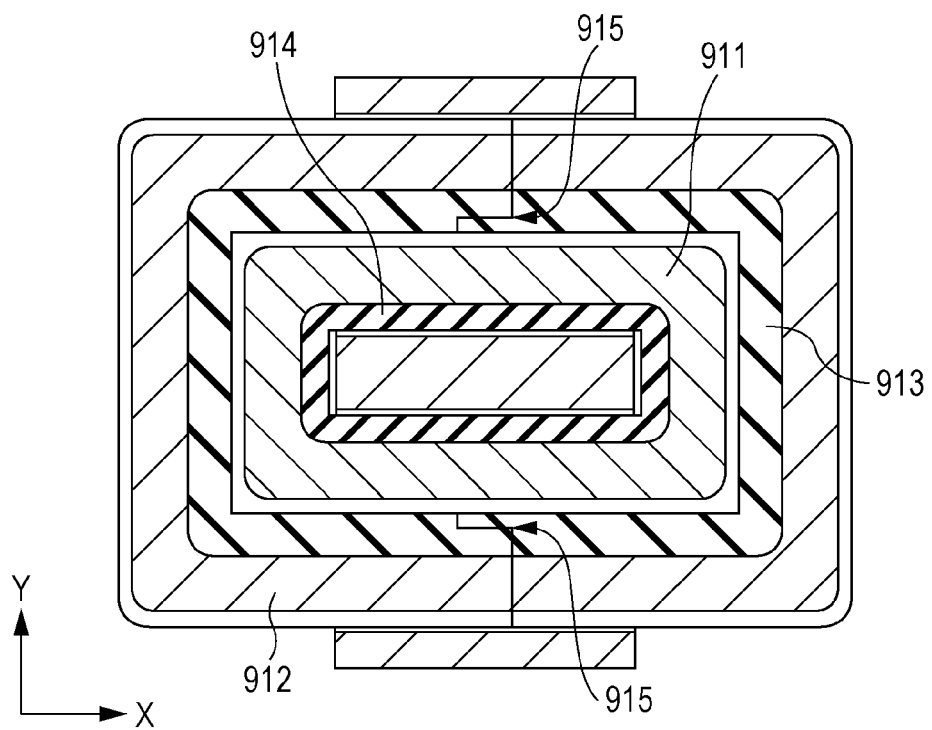
FIG. 28 is a cross-sectional view depicting the structure of a transformer of another comparative example.

FIG. 28 depicts a transformer of another comparative example. In FIG. 28, an outer winding 912 is wound onto the outside of an inner winding 911. Then, after these windings have been wound, the windings are molded with a thermosetting insulating resin having high thermal conductivity. In this transformer, the inner winding 911 functions as a primary winding, and the outer winding 912 functions as a secondary winding. In FIG. 28, in order to handle winding-thickening that occurs when the inner winding 911 is wound onto an inner bobbin 914, an air layer is provided between an outer bobbin 913 and the inner winding 911.

The transformer depicted in FIG. 27 has a problem in that the sealing resin 903 for increasing the heat dissipating property of the primary windings and the secondary windings causes the weight of the transformer to increase.

The transformer depicted in FIG. 28 has a problem in that, in the case where winding pressure is applied to the outer bobbin 913 due to the outer winding 912 being wound around, the outer bobbin 913 bends toward the air layer. If this bending becomes excessive, there is a risk of the outer bobbin 913 breaking.

The transformer depicted in FIG. 28 has a problem in that variation in the winding-thickening or winding-thinning of the inner winding 911 causes the distance between the inner winding 911 and the outer winding 912 to vary, and leakage inductance therefore varies.

Thus, the present inventors examined a magnetic device in which a bobbin and a winding are brought into close contact. This magnetic device enables heat of the winding to be dissipated via the bobbin. For example, the sealing resin can be reduced or omitted to reduce weight of the device while maintaining a high heat dissipating property.

In consideration of the above, the present inventors arrived at the present disclosure.

Overview of Embodiments

A magnetic device according to one aspect of the present disclosure is provided with a winding in which a conductive wire is wound around, and a bobbin arranged at the outer peripheral side of the winding. The bobbin includes a first bobbin member and a second bobbin member, and an end of the first bobbin member opposes an end of the second bobbin member. The winding and the first bobbin member are provided in contact with each other, and the winding and the second bobbin member are provided in contact with each other. A gap is provided between the end of the first bobbin member and the end of the second bobbin member in the circumferential winding direction of the winding.

According to the present aspect, the winding and the first and second bobbin members can be appropriately brought into contact even in the case where the winding has become thicker and even in the case where the winding has become thinner. Consequently, heat can be suitably dissipated via the first bobbin member and the second bobbin member even when the winding generates heat. In the case where resin molding is omitted or reduced, the weight of the magnetic device can be reduced while securing the heat dissipating property of the winding. Furthermore, the distance between an inner winding and an outer winding is fixed to correspond to the bobbin thickness, and therefore leakage inductance is stable even in the case where the winding has become thicker and even in the case where the winding has become thinner.

In the aforementioned aspect, the bobbin may further include a third bobbin member. The other end of the first bobbin member may oppose one end of the third bobbin member. The other end of the second bobbin member may oppose the other end of the third bobbin member. The winding and the third bobbin member may be provided in contact with each other. A gap may be provided between an end of the first bobbin member and an end of the third bobbin member in the circumferential winding direction of the winding. A gap may be provided between an end of the second bobbin member and an end of the third bobbin member in the circumferential winding direction of the winding.

It should be noted that the "first bobbin member" is an example of a "first insulator", the "second bobbin member" is an example of a "second insulator", and the "third bobbin member" is an example of a "third insulator".

In this case, the winding and the first, second, and third bobbin members can be appropriately brought into contact even in the case where the winding has become thicker and even in the case where the winding has become thinner, and heat of the winding can be dissipated via these bobbin members.

In the aforementioned aspect, the winding may be formed with the conductive wire being wound around in a shape including a short area and a long area. The end of the first bobbin member and the end of the second bobbin member may be located beside the short area of the winding.

In this case, the long area of the winding and the first and second bobbin members can be appropriately brought into contact. Thus, a comparatively large contact area can be secured, and heat of the winding can be suitably dissipated via the first bobbin member and the second bobbin member.

In the aforementioned aspect, the winding may be formed with the conductive wire being wound around in a shape including a short area and a long area. The end of the first bobbin member and the end of the second bobbin member may oppose a portion between the short area of the winding and the long area of the winding.

In this case, the long area of the winding and the first bobbin member can be appropriately brought into contact, and the short area of the winding and the second bobbin member can be appropriately brought into contact. Alternatively, the short area of the winding and the first bobbin member can be appropriately brought into contact, and the long area of the winding and the second bobbin member can be appropriately brought into contact. As a result, heat of the winding can be suitably dissipated via the first bobbin member and the second bobbin member even in the case where there are variations in the winding action for the winding.

It should be noted that the "long area of the winding" is an example of a "first portion of the winding", and the "short area of the winding" is an example of a "second portion of the winding". Furthermore, the "long area of the winding" is an example of a "linear portion of the winding". The length of the long area and/or linear portion of the winding is longer than ¼ of the length of one turn of the winding, for example.

In the aforementioned aspect, the end of the first bobbin member and the end of the second bobbin member may have a stepped face.

In this case, the creepage distance from the inner circumferential side to the outer circumferential side in the ends of the first and second bobbin members can become longer. The insulating property can be therefore improved.

In the aforementioned aspect, one of the end of the first bobbin member and the end of the second bobbin member may have a return structure that engages with the other.

In this case, the first bobbin member and the second bobbin member can be less likely to detach. As a result, it is possible to prevent loosening in the case where a winding is wound around a bobbin.

A power conversion device according to one aspect of the present disclosure is provided with the magnetic device of any of the aforementioned aspects, and a power conversion circuit that is connected to the winding.

According to the present aspect, heat generated in the winding by the operation of the power conversion circuit can be suitably dissipated via the first bobbin member and the second bobbin member.

Hereinafter, embodiments according to the present disclosure will be described with reference to the drawings. It should be noted that the same reference symbols are used for the same constituent elements in the drawings.

It should be noted that the embodiments described hereinafter all represent comprehensive or specific examples. The numerical values, the shapes, the materials, the constituent elements, the arrangement positions and modes of connection of the constituent elements, and the like given in the following embodiments are examples and are not intended to restrict the present disclosure. Furthermore, constituent elements that are not described in the independent claims indicating the most significant concepts from among the constituent elements in the following embodiments are described as optional constituent elements.

Embodiment 1

Figure 1:
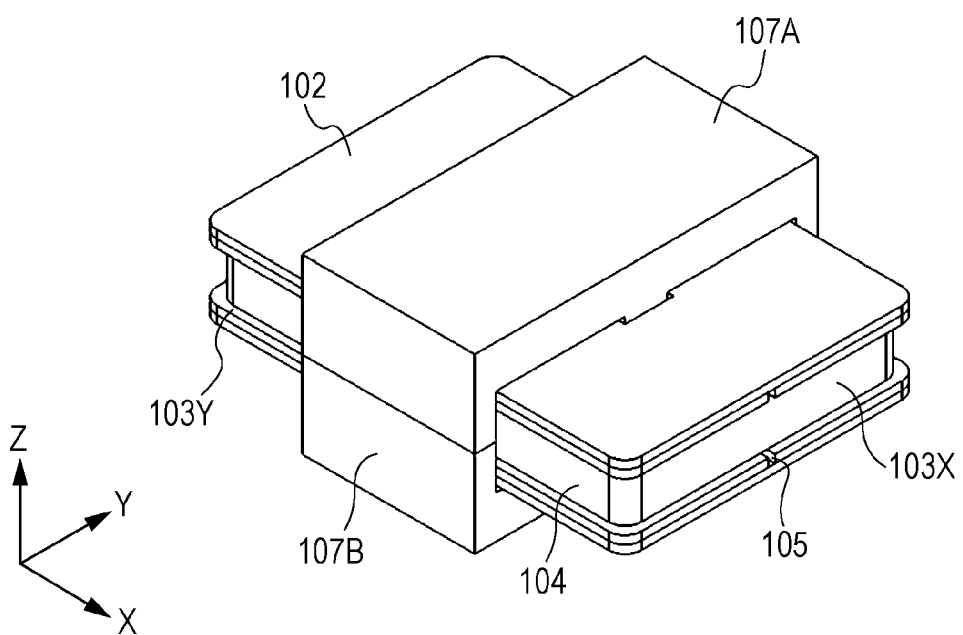
FIG. 1 is a perspective view depicting an example of the structure of a transformer according to embodiment 1.
Figure 2:
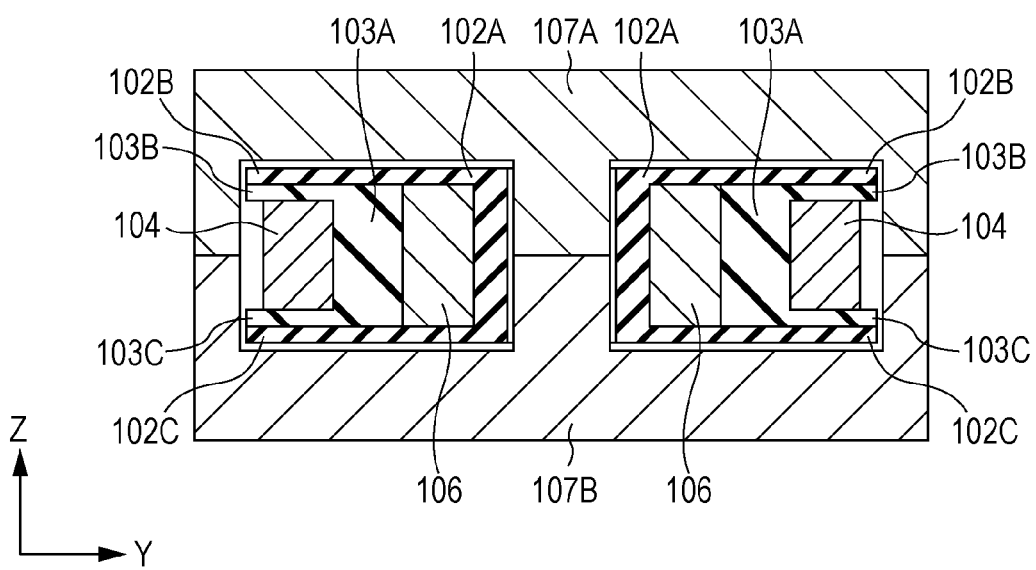
FIG. 2 is a cross-sectional view along a plane that includes the winding axis of the transformer according to embodiment 1.
Figure 3:
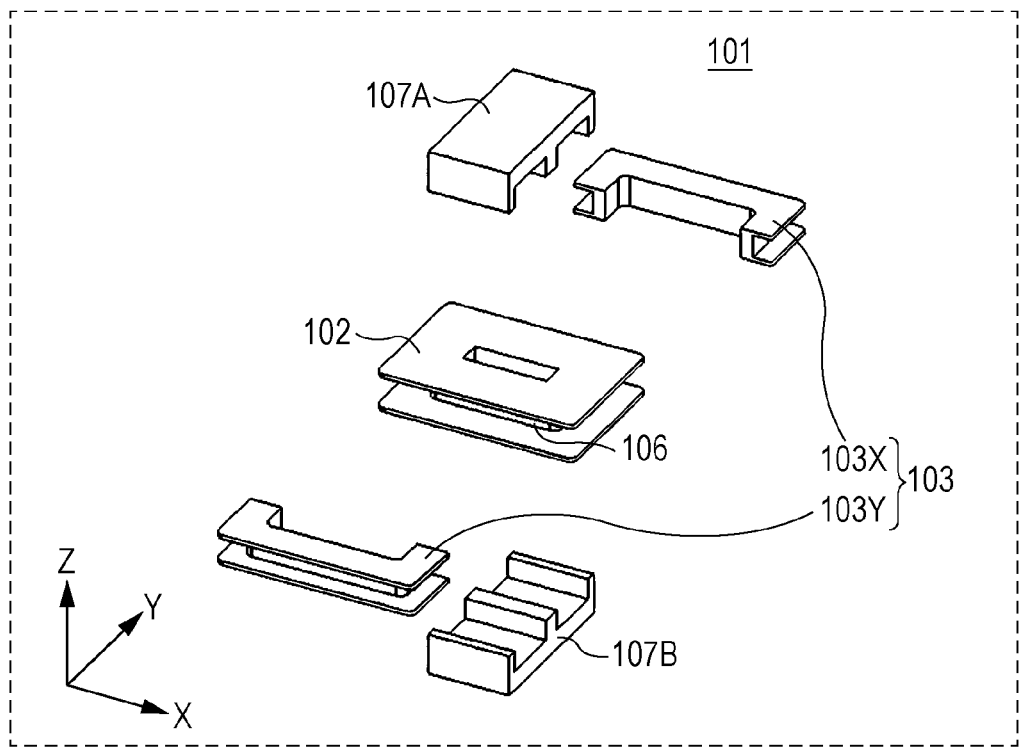
FIG. 3 is an exploded perspective view of the transformer according to embodiment 1.
Figure 4:
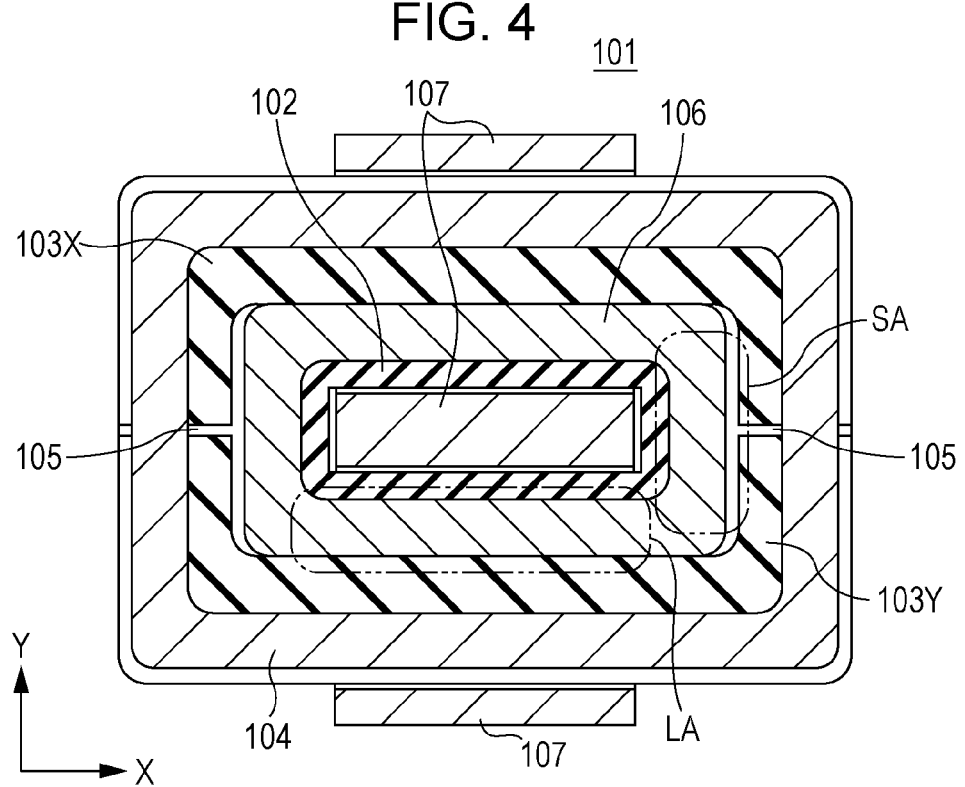
FIG. 4 is a cross-sectional view along a plane perpendicular to the winding axis direction of the transformer according to embodiment 1.

FIG. 1 is a perspective view schematically depicting the structure of a transformer 101 according to embodiment 1. FIG. 2 is a cross-sectional view along a YZ plane including the winding axis of the transformer 101 depicted in FIG. 1. FIG. 3 is an exploded perspective view depicting the transformer 101 depicted in FIG. 1. FIG. 4 is a cross-sectional view along an XY plane perpendicular to the winding axis direction of the transformer 101 depicted in FIG. 1. The transformer 101 is an example of a "magnetic device" in the present disclosure.

The transformer 101 is used in a power conversion circuit such as a DC-DC converter. The structure of the transformer 101 will be described using FIGS. 1 to 4.

The transformer 101 is provided with an inner bobbin 102, an inner winding 106, an outer bobbin 103, an outer winding 104, and a core 107.

The inner bobbin 102 is formed of an insulating resin, for example. The inner bobbin 102 includes an inner column 102A extending in the winding axis direction (i.e., Z direction), an inner upper flange 102B formed at one end of the inner column 102A, and an inner lower flange 102C formed at the other end. The inner column 102A may have a square column shape.

The inner winding 106 is formed of a conductive wire such as a single wire or a litz wire. The inner winding 106 is wound onto the inner bobbin 102. As depicted in FIG. 4, the inner winding 106 is formed with the conductive wire being wound around, in a shape having a short area SA parallel to the Y direction and a long area LA parallel to the X direction.

The outer bobbin 103 is formed of an insulating resin, for example. The outer bobbin 103 includes a first bobbin member 103X and a second bobbin member 103Y. The first bobbin member 103X and the second bobbin member 103Y have the same shape, and are formed in a squared U-shape when viewed from the Z direction. The ends of the first bobbin member 103X oppose the ends of the second bobbin member 103Y. Gaps 105 are provided between the ends of the first bobbin member 103X and the ends of the second bobbin member 103Y in the winding direction of the inner winding 106. The size of the gaps 105 may be larger than 0 mm and equal to or less than 3 mm, for example.

The first bobbin member 103X and the second bobbin member 103Y each include an outer column 103A extending in the winding axis direction (i.e., Z direction), an outer upper flange 103B formed at one end of the outer column 103A, and an outer lower flange 103C formed at the other end. The outer columns 103A and 103B constitutes a square column by being assembled. The shape of the ends of the first bobbin member 103X and the ends of the second bobbin member 103Y are described later on.

The outer winding 104 is formed of a conductive wire such as a single wire or a litz wire. The outer winding 104 is wound onto the outer bobbin 103.

The core 107 is formed of a magnetic material such as a ferrite, a dust core, or an amorphous alloy. The core 107 includes a core 107A and a core 107B. The core 107A and the core 107B have the same shape, and are formed in an E-shape when viewed from the X direction. Hereinafter, the core 107A and the core 107B are sometimes collectively referred to as the core 107.

The gaps 105 in the outer bobbin 103 are located beside the short areas of the inner winding 106, as depicted in FIG. 4. The outer bobbin 103 and the long areas of the inner winding 106 are thereby in contact with each other.

When the transformer 101 is assembled, first, the inner winding 106 is wound onto the inner column 102A of the inner bobbin 102. Next, the outer bobbin 103 is arranged by being made to slide along the XY plane such that the outer column 103A comes into contact with the inner winding 106. Next, the outer winding 104 is wound onto the outer column 103A. Finally, the core 107 is arranged by being made to slide along the ZY plane.

The gaps 105 in the outer bobbin 103 become larger as the inner winding 106 becomes thicker, and the gaps 105 becomes smaller as the inner winding 106 becomes thinner. Therefore, in either case, the pair of long areas of the inner winding 106 and the outer bobbin 103 are appropriately in contact. As a result, heat of the inner winding 106 can be suitably transmitted to the outer bobbin 103, and thus the heat dissipating property of the inner winding 106 can be improved.

Next, an example will be described in which the results of a thermal analysis of windings in a coil device according to the present embodiment and a coil device according to a comparative example are compared.

Figure 5:
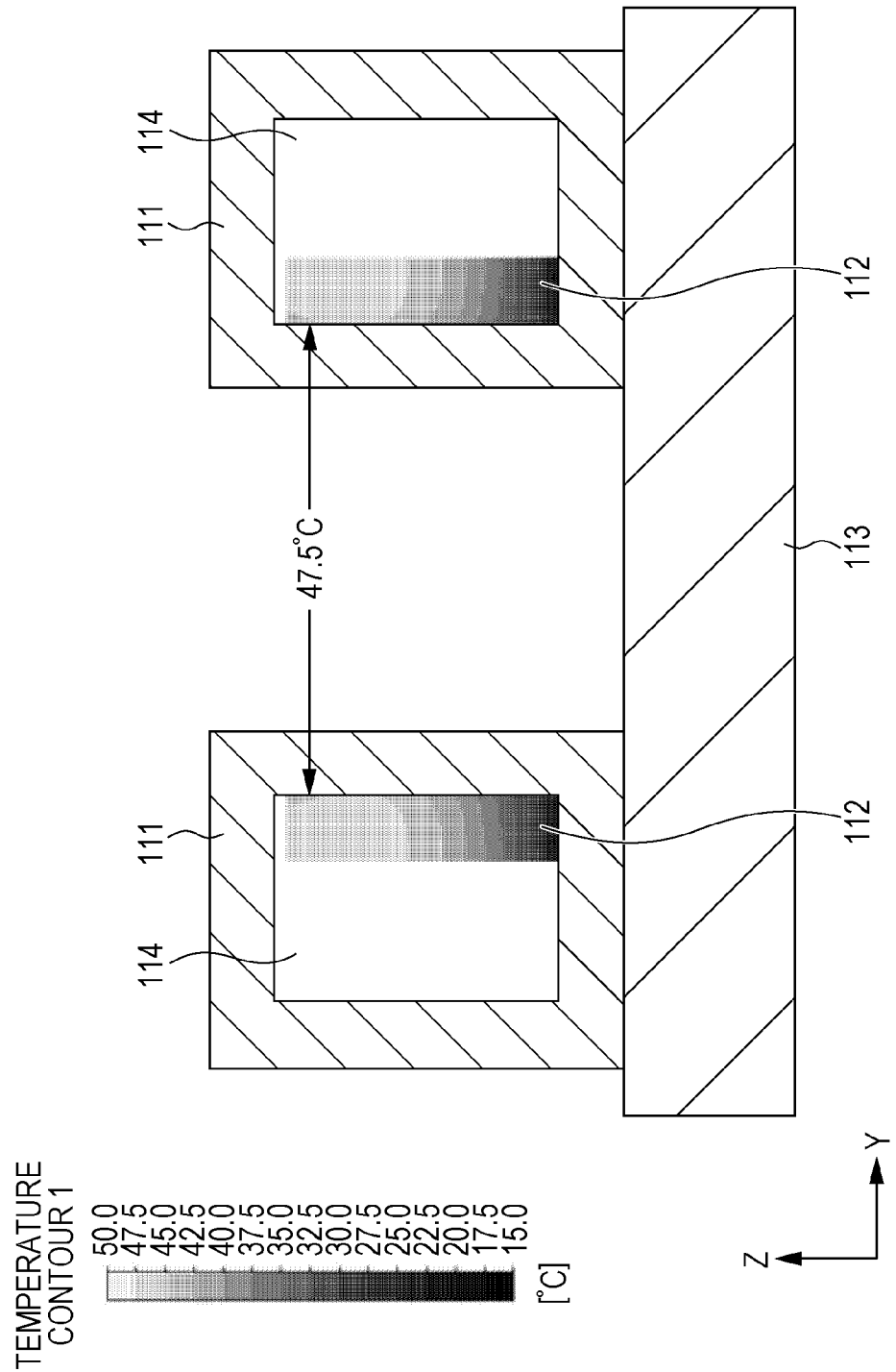
FIG. 5 is a drawing depicting an example of heat distribution in a cross section along a plane that includes the winding axis of a transformer according to a comparative example.
Figure 6:
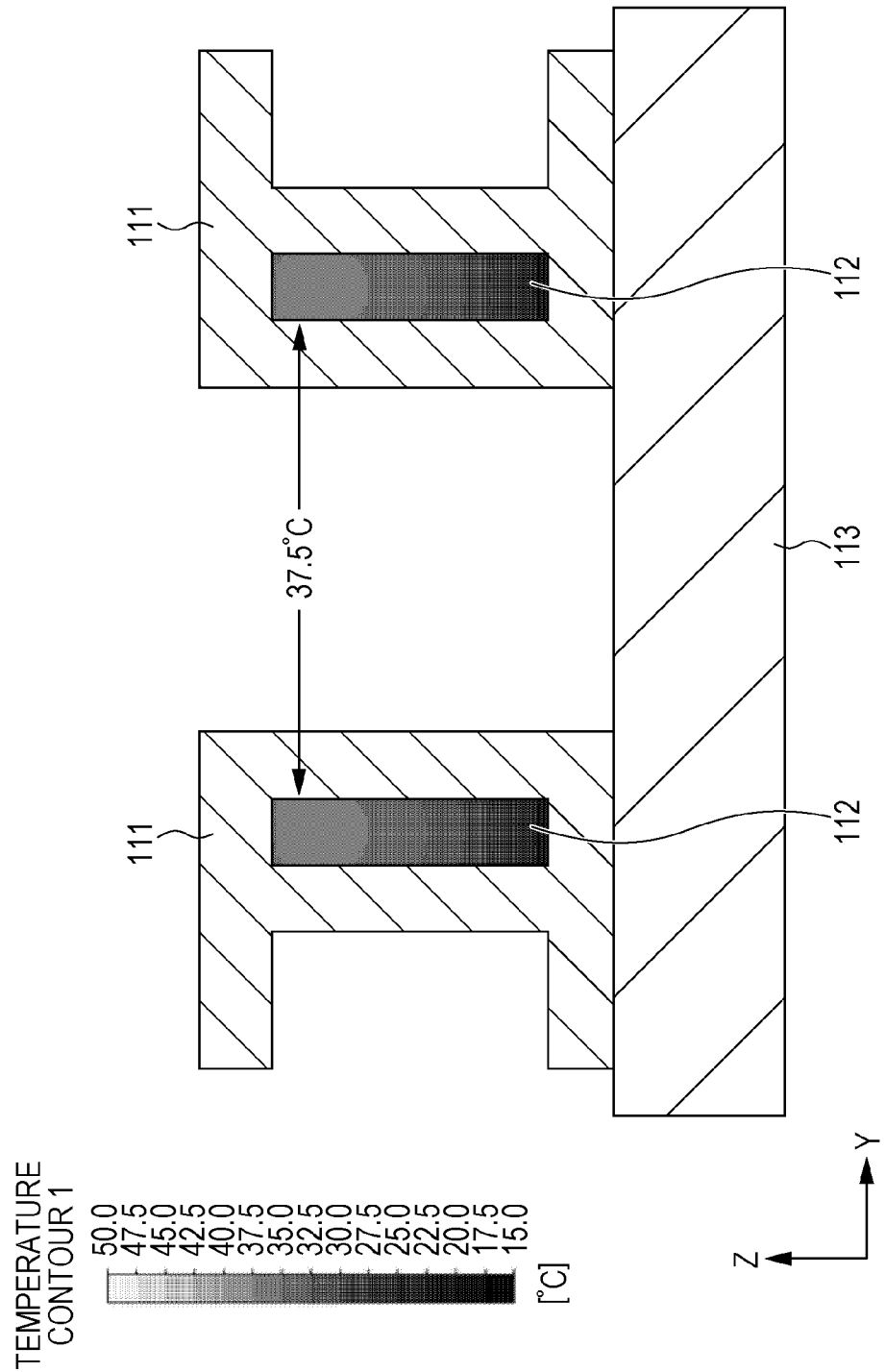
FIG. 6 is a drawing depicting an example of heat distribution in a cross section along a plane that includes the winding axis of the transformer according to embodiment 1.

FIG. 5 depicts a temperature distribution along a YZ plane that includes the winding axis in the coil device having the structure of the comparative example. FIG. 6 depicts a temperature distribution along a YZ plane that includes the winding axis in the coil device according to the present embodiment.

In the thermal analysis depicted in FIG. 6, a coil device having the structure depicted in FIG. 4 was used as the coil device according to the present embodiment. This coil device has gaps beside short areas of a winding. Long areas of a winding 112 and a bobbin 111 are therefore in contact.

Meanwhile, a coil device having a structure such as that depicted in FIG. 28 was used as the coil device according to the comparative example. In the coil device used in the thermal analysis of FIG. 5, gaps are not provided in joining parts 915 of the outer bobbin 913, and an air layer 114 is provided between the winding 112 and the bobbin 111.

In FIGS. 5 and 6, a thermal analysis was carried out without there being a core or an outer winding. In both of the coil devices, a loss of 10 W was given for the inner winding. The ambient temperature was 25° C. A heat sink 113 was arranged so as to be in contact with the bottom face of the coil devices, and the temperature of the heat sink 113 was 15° C.

In FIG. 5, the highest value of the temperature of the winding 112 reaches 47.5° C., whereas, in FIG. 6, the highest value of the temperature of the winding 112 is suppressed to 37.5° C. From these results, it is apparent that, in the structure of the present embodiment, a rise in the temperature of the winding can be suppressed compared to the structure of the comparative example.

Figure 7:
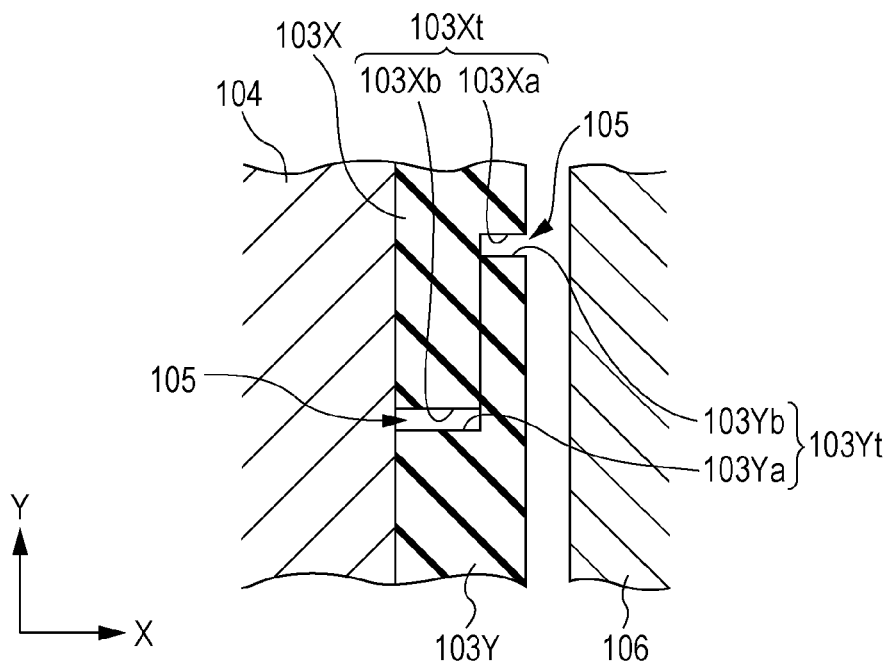
FIG. 7 is a cross-sectional view along an XY plane depicting an example of the shape of an end of an outer bobbin.
Figure 8:
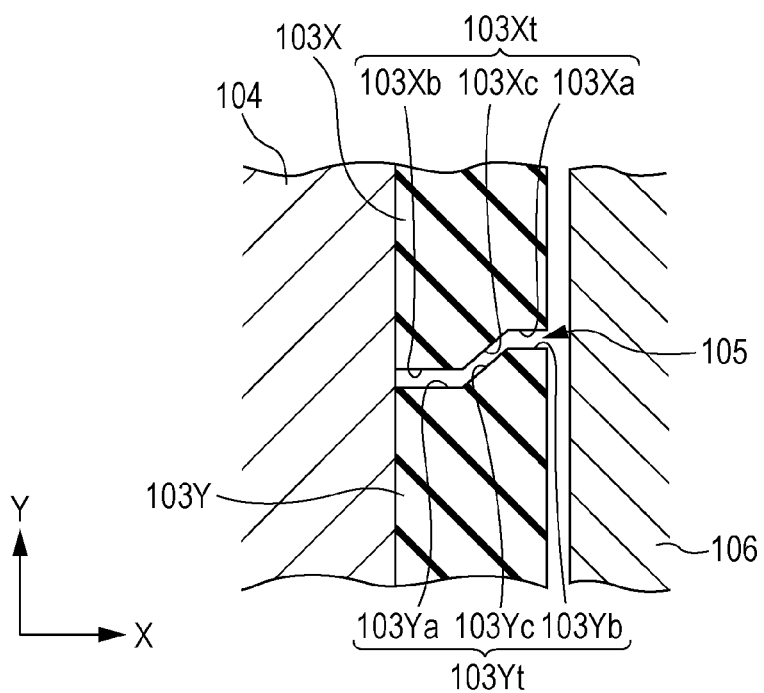
FIG. 8 is a cross-sectional view along the XY plane depicting an example of the shape of the end of the outer bobbin.

FIGS. 7 and 8 are cross-sectional views along an XY plane depicting examples of the shape of an end 103Xt of the first bobbin member 103X and an end 103Yt of the second bobbin member 103Y.

In FIG. 7, the end 103Xt of the first bobbin member 103X includes a base end 103Xa and a protrusion 103Xb that protrudes from the base end 103Xa. The end 103Yt of the second bobbin member 103Y includes a base end 103Ya and a protrusion 103Yb that protrudes from the base end 103Ya. The end 103Xt of the first bobbin member 103X and the end 103Yt of the second bobbin member 103Y oppose each other.

Specifically, the protrusion 103Xb of the first bobbin member 103X and the base end 103Ya of the second bobbin member 103Y oppose each other through the gap 105, and the protrusion 103Yb of the second bobbin member 103Y and the base end 103Xa of the first bobbin member 103X oppose each other through the gap 105. Furthermore, the protrusion 103Xb of the first bobbin member 103X and the protrusion 103Yb of the second bobbin member 103Y abut in the X direction.

To paraphrase, the end 103Xt of the first bobbin member 103X has a stepped end face that includes an end face of the base end 103Xa and an end face and a side face of the protrusion 103Xb. The end 103Yt of the second bobbin member 103Y has a stepped end face that includes an end face of the base end 103Ya and an end face and a side face of the protrusion 103Yb. These two stepped end faces oppose each other.

In FIG. 8, the end 103Xt of the first bobbin member 103X includes an inclined end face 103Xc between the base end 103Xa and the protrusion 103Xb. The end 103Yt of the second bobbin member 103Y includes an inclined end face 103Yc between the base end 103Ya and the protrusion 103Yb.

In FIG. 8, the protrusion 103Xb of the first bobbin member 103X and the base end 103Ya of the second bobbin member 103Y oppose each other through the gap 105, and the protrusion 103Yb of the second bobbin member 103Y and the base end 103Xa of the first bobbin member 103X oppose each other through the gap 105. Furthermore, the inclined end face 103Xc of the first bobbin member 103X and the inclined end face 103Yc of the second bobbin member 103Y oppose each other through the gap 105.

To paraphrase, the end 103Xt of the first bobbin member 103X has a stepped end face that includes the end face of the base end 103Xa, the end face of the protrusion 103Xb, and the inclined end face 103Xc. The end 103Yt of the second bobbin member 103Y has a stepped end face that includes the end face of the base end 103Ya, the end face of the protrusion 103Yb, and the inclined end face 103Yc. These two stepped end faces oppose each other.

Due to the end 103Xt of the first bobbin member 103X and the end 103Yt of the second bobbin member 103Y each having a stepped end face as depicted in FIGS. 7 and 8, the creepage distance of the outer bobbin 103 between the inner winding 106 and the outer winding 104 can be lengthened without losing the heat dissipating property of the inner winding 106. As a result, the insulating property can be improved.

Figure 9:
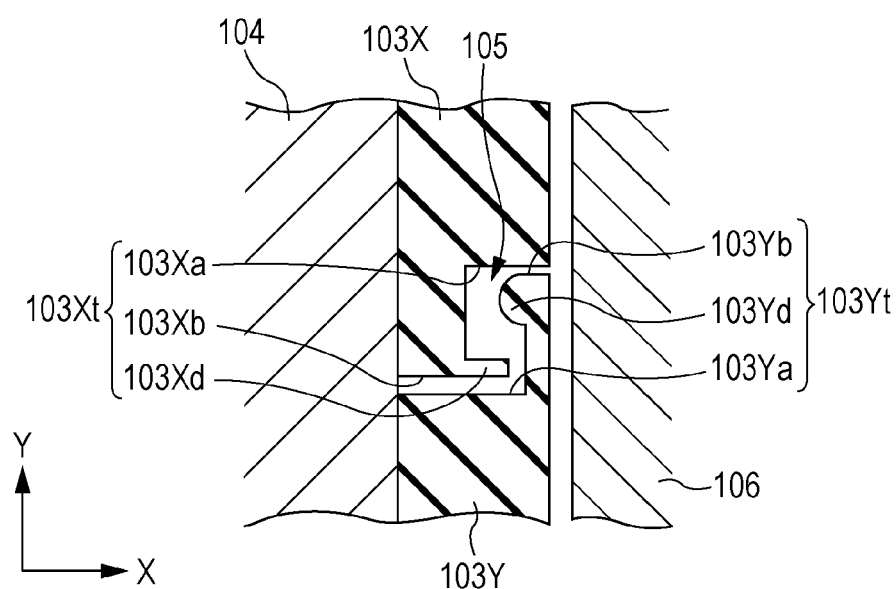
FIG. 9 is a cross-sectional view along the XY plane depicting an example of the shape of the end of the outer bobbin.
Figure 10:
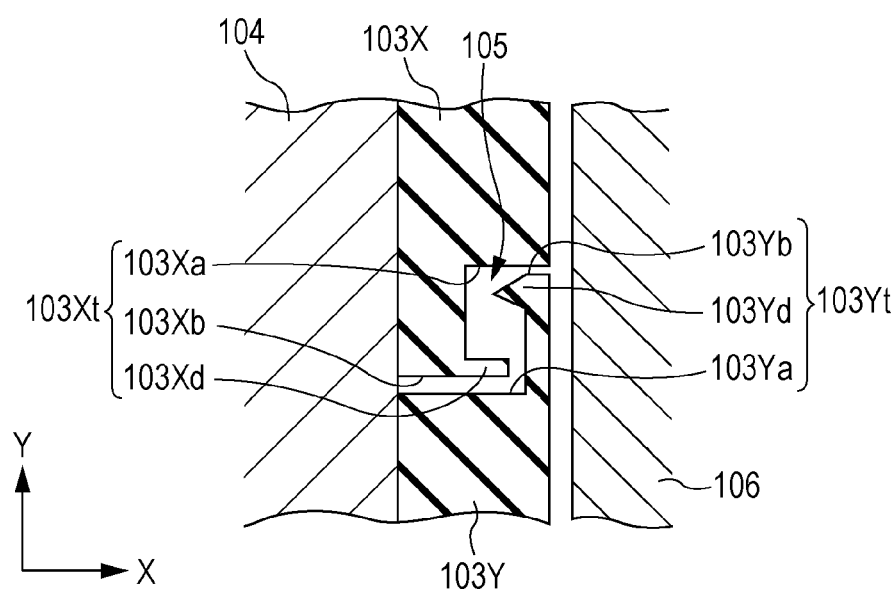
FIG. 10 is a cross-sectional view along the XY plane depicting an example of the shape of the end of the outer bobbin.

FIGS. 9 and 10 are cross-sectional views along the XY plane depicting other examples of the shape of the end 103Xt of the first bobbin member 103X and the end 103Yt of the second bobbin member 103Y.

In FIG. 9, the protrusion 103Xb of the first bobbin member 103X includes, at a tip thereof, an engaging part 103Xd that extends in the X direction. The protrusion 103Yb of the second bobbin member 103Y includes, at a tip thereof, a semicircular engaging part 103Yd that is formed protruding in the X direction.

In FIG. 9, the protrusion 103Xb of the first bobbin member 103X and the base end 103Ya of the second bobbin member 103Y oppose each other through the gap 105, and the protrusion 103Yb of the second bobbin member 103Y and the base end 103Xa of the first bobbin member 103X oppose each other through the gap 105.

In FIG. 9, as the gaps 105 widens, the engaging part 103Xd of the first bobbin member 103X and the engaging part 103Yd of the second bobbin member 103Y engage.

To paraphrase, the end 103Xt of the first bobbin member 103X has a recess defined by the base end 103Xa, the protrusion 103Xb, and the engaging part 103Xd. The end 103Yt of the second bobbin member 103Y has a protrusion serving as the engaging part 103Yd. The protrusion of the end 103Yt of the second bobbin member 103Y engages with the recess in the end 103Xt of the first bobbin member 103X.

The structure depicted in FIG. 10 is different from the structure depicted in FIG. 9 only in that the engaging part 103Yd of the second bobbin member 103Y is formed in a triangular shape.

Due to the engaging part 103Xd being provided in the end 103Xt of the first bobbin member 103X and the engaging part 103Yd being provided in the end 103Yt of the second bobbin member 103Y as depicted in FIGS. 9 and 10, the second bobbin member 103Y can be less likely to detach from first bobbin member 103X when the outer winding 104 is wound. Furthermore, the creepage distance of the outer bobbin 103 between the inner winding 106 and the outer winding 104 can be lengthened without losing the heat dissipating property of the inner winding 106. As a result, the insulating property can be improved.

Figure 11:
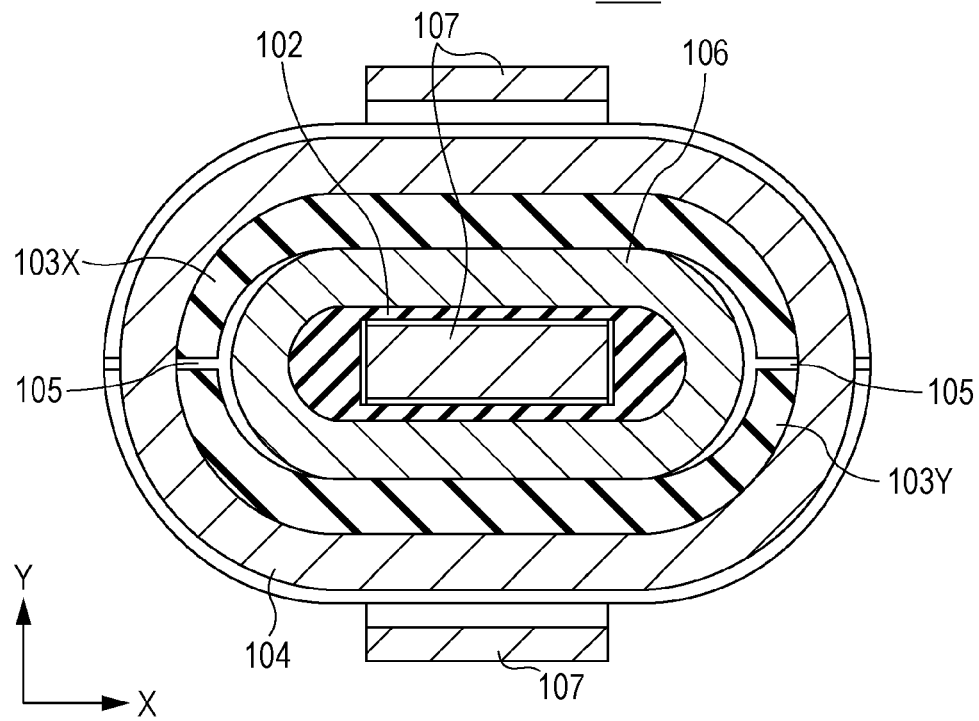
FIG. 11 is a cross-sectional view along a plane perpendicular to the winding axis direction of the structure of a transformer according to a modified example of embodiment 1.

FIG. 11 is a cross-sectional view along an XY plane perpendicular to the winding axis direction of a transformer 101A according to a modified example of the present embodiment. In FIG. 11, the inner winding 106 is formed with a conductive wire being wound around, in a shape having arc-shaped areas that have a chord extending in the Y direction, and long areas extending in the X direction. It should be noted that the arc-shaped areas of the inner winding 106 are an example of a "corner". Furthermore, the first bobbin member 103X and the second bobbin member 103Y have the same shape, and are formed in a U-shape when viewed from the Z direction. The outer bobbin 103 and the inner winding 106 are in close contact at linear portions, and therefore the same effect as that of the transformer 101 can be obtained also in a case such as this.

As described above, in embodiment 1, a pair of linear portions (e.g., a pair of long areas) of the outer bobbin 103 and the inner winding 106 are in close contact. Therefore, bending is less likely to occur in the outer bobbin 103 and the possibility of the outer bobbin 103 breaking can be reduced even in the case where winding pressure is applied to the outer bobbin 103 when the outer winding 104 is wound around the outer bobbin 103.

The gaps 105 in the outer bobbin 103 become smaller in the case where the inner winding 106 becomes thinner due to variation that occurs when winding is performed. The gaps 105 in the outer bobbin 103 become larger in the case where the inner winding 106 becomes thicker due to variation that occurs when winding is performed. In either case, the distance between the inner winding 106 and the outer winding 104 is fixed to correspond to the thickness of the outer bobbin 103. It is therefore possible to reduce variation in leakage inductance. Furthermore, a bobbin having a structure same as or similar to the outer bobbin 103 may be additionally arranged outside of the outer winding 104. It is thereby possible to also improve the heat dissipating property of the outer winding 104.

The transformer 101 may not have the core 107.

The core 107 depicted in FIG. 3 is made up of the two E-shaped cores 107A and 107B, but there is no restriction thereto. For example, the core 107 may be made up of an E-shaped core and an I-shaped core.

Figure 12:
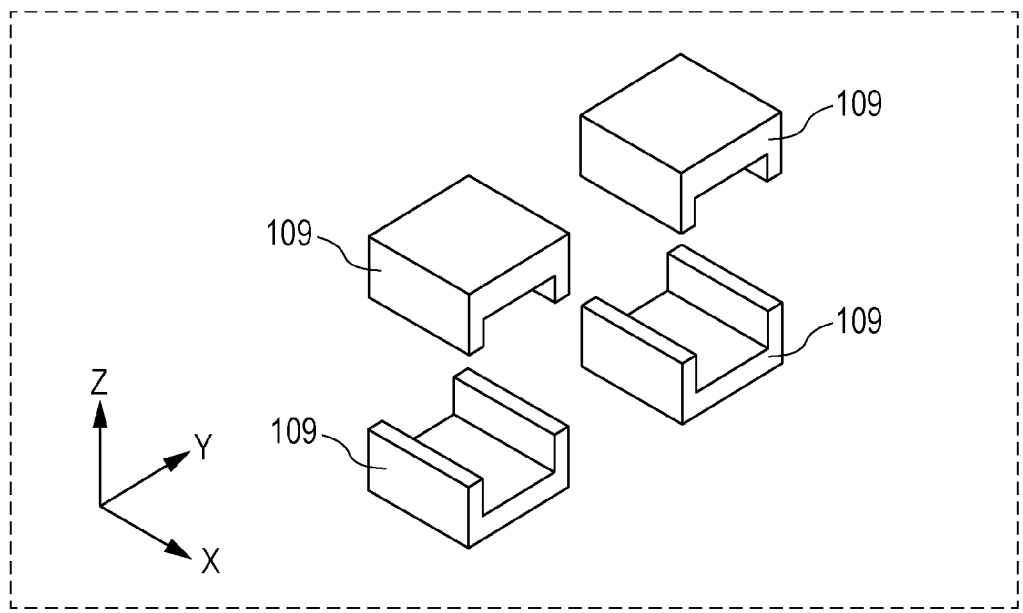
FIG. 12 is a perspective view schematically depicting a modified example of the structure of a core according to embodiment 1.

FIG. 12 is a perspective view schematically depicting another example configuration of the core. As depicted in FIG. 12, the central leg of the core is divided, and a structure is possible in which one pair of cores 109 having a squared U-shape when viewed from the X direction are fit together in the Z direction, and two pairs of such cores 109 are made to abut in the Y direction.

In the example depicted in FIG. 4, the winding axis of the inner winding 106 and the winding axis of the outer winding 104 are shared, but there is no restriction thereto, and a central axis that is different from the inner winding 106 and the outer winding 104 may be shared.

Embodiment 2

A designer can design various bobbins on the basis of the design principles described in relation to embodiment 1. In embodiment 2, a magnetic device provided with two bobbin members arranged with gaps therebetween is described.

Figure 13:
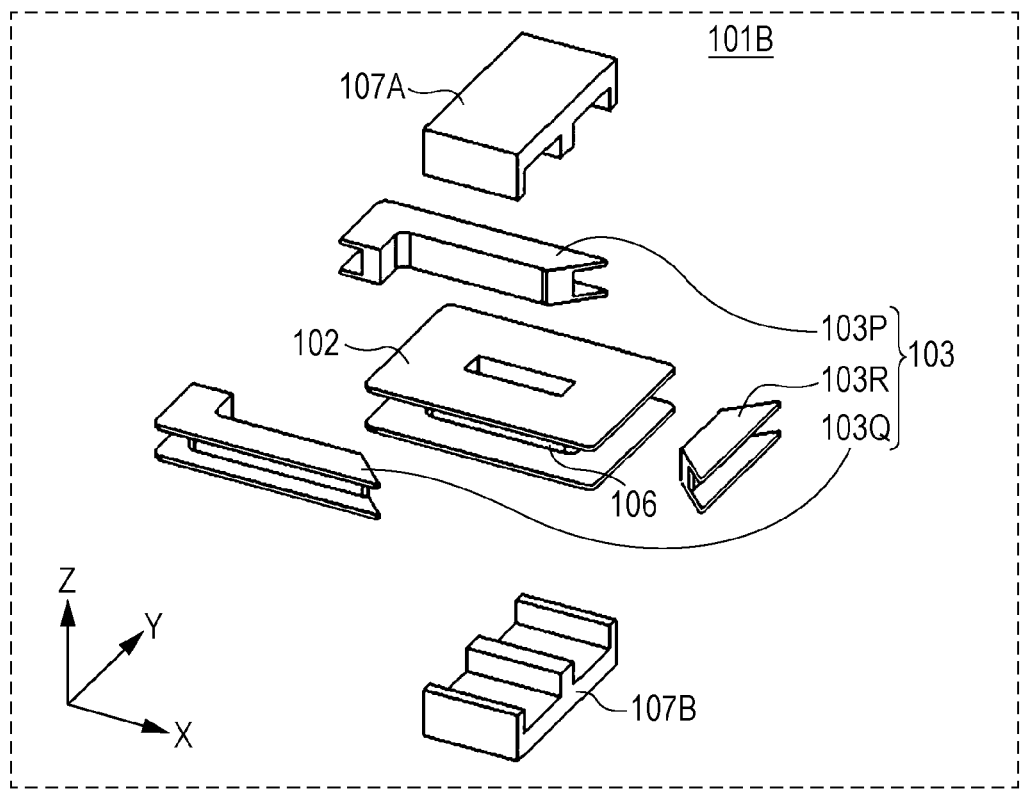
FIG. 13 is an exploded perspective view of a transformer according to embodiment 2.
Figure 14:
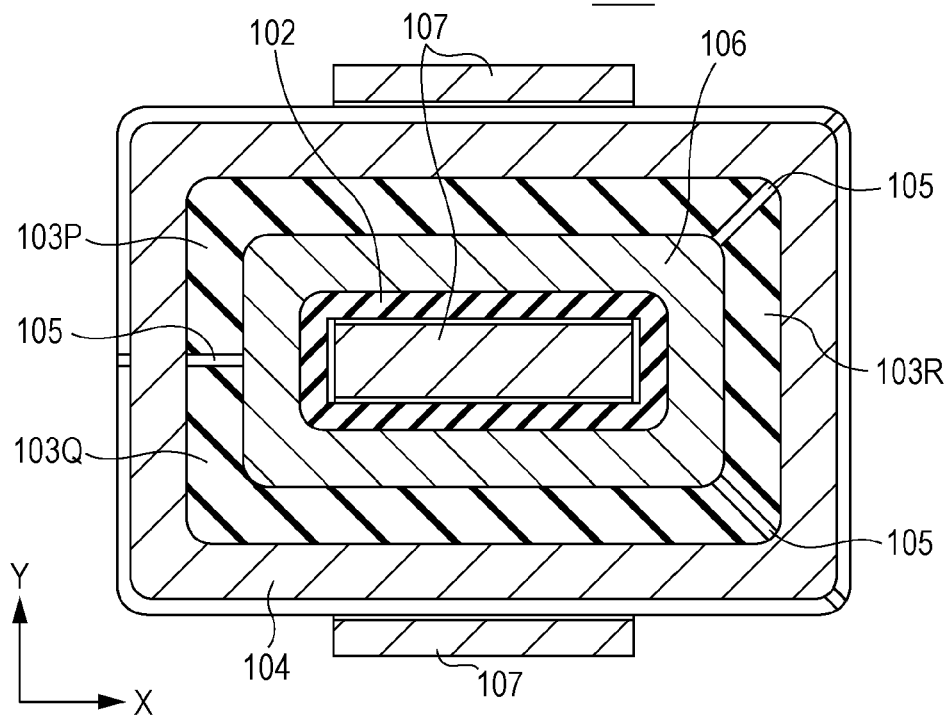
FIG. 14 is a cross-sectional view along a plane perpendicular to the winding axis direction of the transformer according to embodiment 2.

FIG. 13 is an exploded perspective view of a transformer 101B according to embodiment 2. FIG. 14 is a cross-sectional view along an XY plane perpendicular to the winding axis direction of the transformer 101B. It should be noted that a cross-sectional view along a YZ plane that includes the winding axis of the transformer 101B is the same as FIG. 2. The transformer 101B is an example of a "magnetic device" in the present disclosure. The structure of the transformer 101B of embodiment 2 will be described using FIGS. 2, 13, and 14.

The transformer 101B is provided with an inner bobbin 102, an inner winding 106, an outer bobbin 103, an outer winding 104, and a core 107.

The inner bobbin 102 is formed of an insulating resin, for example. The inner bobbin 102 includes an inner column 102A extending in the winding axis direction (i.e., Z direction), an inner upper flange 102B formed at one end of the inner column 102A, and an inner lower flange 102C formed at the other end.

The inner winding 106 is formed of a conductive wire such as a single wire or a litz wire. The inner winding 106 is wound onto the inner bobbin 102. As depicted in FIG. 14, the inner winding 106 is formed with the conductive wire being wound around, in a shape having short areas parallel to the Y direction and long areas parallel to the X direction.

The outer bobbin 103 is formed of an insulating resin, for example. The outer bobbin 103 includes a first bobbin member 103P, a second bobbin member 103Q, and a third bobbin member 103R. The first bobbin member 103P and the second bobbin member 103Q are formed in an L-shape when viewed from the Z direction. The third bobbin member 103R is formed in an I-shape when viewed from the Z direction.

One end of the first bobbin member 103P opposes one end of the second bobbin member 103Q. The other end of the first bobbin member 103P opposes one end of the third bobbin member 103R. The other end of the second bobbin member 103Q opposes the other end of the third bobbin member 103R. Gaps 105 are provided between the ends of the bobbin members in the winding direction of the inner winding 106.

The first bobbin member 103P, the second bobbin member 103Q, and the third bobbin member 103R each include an outer column 103A extending in the winding axis direction (i.e., Z direction), an outer upper flange 103B formed at one end of the outer column 103A, and an outer lower flange 103C formed at the other end. The outer columns 103A of the first to third bobbin members 103P, 103Q, and 103R constitutes a square column by being assembled.

The outer winding 104 is formed of a conductive wire such as a single wire or a litz wire. The outer winding 104 is wound onto the outer bobbin 103.

The core 107 is formed of a magnetic material such as a ferrite, a dust core, or an amorphous alloy. The core 107 includes a core 107A and a core 107B. The core 107A and the core 107B each have the same shape, and are formed in an E-shape when viewed from the X direction. Hereinafter, the core 107A and the core 107B are sometimes collectively referred to as the core 107.

As depicted in FIG. 14, the gap 105 between the first bobbin member 103P and the second bobbin member 103Q is located beside a first short area of the inner winding 106. As depicted in FIG. 14, the gap 105 between the first bobbin member 103P and the third bobbin member 103R is located beside a corner between a second short area and a first long area of the inner winding 106, and the gap 105 between the second bobbin member 103Q and the third bobbin member 103R is located beside a corner between the second short area and a second long area of the inner winding 106. The outer bobbin 103 and the inner winding 106 are thereby in contact with each other at the long areas of the inner winding 106 and the second short area in FIG. 14.

When the transformer 101B is assembled, first, the inner winding 106 is wound onto the inner column 102A of the inner bobbin 102. Next, the outer bobbin 103 is arranged by being made to slide along the XY plane such that the outer column 103A comes into contact with the inner winding 106. Next, the outer winding 104 is wound onto the outer column 103A. Finally, the core 107 is arranged by being made to slide along the ZY plane.

The gaps 105 in the outer bobbin 103 become larger as the inner winding 106 becomes thicker, and the gaps 105 becomes smaller as the inner winding 106 becomes thinner. In either case, the pair of long areas and one short area of the inner winding 106 and the outer bobbin 103 are appropriately in contact. As a result, heat of the inner winding 106 can be suitably transmitted to the outer bobbin 103, and thereby the heat dissipating property of the inner winding 106 can be improved.

Figure 15:
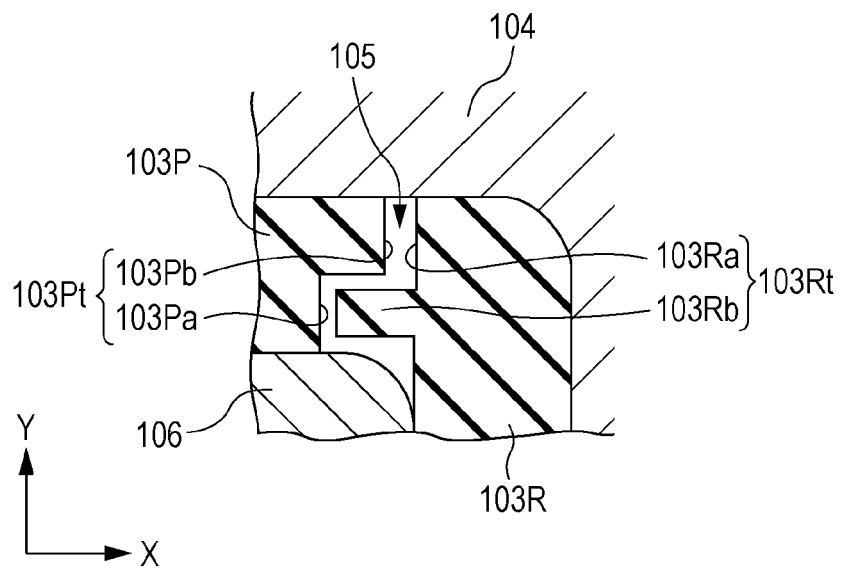
FIG. 15 is a cross-sectional view along an XY plane depicting an example of the shape of an end of an outer bobbin.

FIG. 15 is a cross-sectional view along the XY plane depicting an example of the shape of an end 103Pt of the first bobbin member 103P and an end 103Rt of the third bobbin member 103R.

In FIG. 15, the end 103Pt of the first bobbin member 103P includes a base end 103Pa and a protrusion 103Pb that protrudes from the base end 103Pa. The end 103Rt of the third bobbin member 103R includes a base end 103Ra and a protrusion 103Rb that protrudes from the base end 103Ra. The end 103Pt of the first bobbin member 103P and the end 103Rt of the third bobbin member 103R oppose each other.

Specifically, the protrusion 103Pb of the first bobbin member 103P and the base end 103Ra of the third bobbin member 103R oppose each other through the gap 105, and the protrusion 103Rb of the third bobbin member 103R and the base end 103Pa of the first bobbin member 103P oppose each other through the gap 105. Furthermore, the protrusion 103Pb of the first bobbin member 103P and the protrusion 103Rb of the third bobbin member 103R are adjacent in the Y direction.

To paraphrase, the end 103Pt of the first bobbin member 103P has a stepped end face that includes an end face of the base end 103Pa and an end face and a side face of the protrusion 103Pb. The end 103Rt of the third bobbin member 103R has a stepped end face that includes an end face of the base end 103Ra and an end face and a side face of the protrusion 103Rb. These two stepped end faces oppose each other.

Due to the end 103Pt of the first bobbin member 103P and the end 103Rt of the third bobbin member 103R each having a stepped end face as depicted in FIG. 15, the creepage distance of the outer bobbin 103 between the inner winding 106 and the outer winding 104 can be lengthened without losing the heat dissipating property of the inner winding 106. As a result, the insulating property can be improved.

It should be noted that, in embodiment 2, the shape described with reference to FIGS. 7 to 10 may be adopted for the shape of the end 103Pt of the first bobbin member 103P and an end 103Qt of the second bobbin member 103Q. The same effect can be obtained by means of these shapes. Furthermore, a shape such as that depicted in FIG. 11 may be adopted also for the shape of the transformer 101B of embodiment 2. The same effect can be obtained also with this shape.

As described above, in embodiment 2, the outer bobbin 103 is made up of the three bobbin members 103P, 103Q, and 103R. Compared to the example given in embodiment 1, the contact area can be thereby increased by an amount corresponding to the short area of the inner winding 106 coming into contact with the outer bobbin 103. Therefore, according to embodiment 2, the heat dissipating property can be further improved compared to embodiment 1.

The outer bobbin 103 and linear portions (e.g., long areas) of the inner winding 106 are in close contact. With this configuration, bending is less likely to occur in the outer bobbin 103 even in the case where winding pressure is applied to the outer bobbin 103 when the outer winding 104 is wound around the outer bobbin 103. Therefore, the possibility of the outer bobbin 103 breaking can be reduced.

The distance between the inner winding 106 and the outer winding 104 is fixed to correspond to the thickness of the outer bobbin 103. It is therefore possible to reduce variation in leakage inductance. Furthermore, a bobbin having a structure same as or similar to the outer bobbin 103 may be additionally arranged outside of the outer winding 104. It is thereby possible to also improve the heat dissipating property of the outer winding 104.

The transformer 101B may not have the core 107.

The core 107 depicted in FIG. 13 is made up of the two E-shaped cores 107A and 107B, but there is no restriction thereto. The core 107 may be made up of four squared U-shaped cores, for example. Alternatively, the core 107 may be made up of an E-shaped core and an I-shaped core.

In the example depicted in FIG. 14, the winding axis of the inner winding 106 and the winding axis of the outer winding 104 are shared, but there is no restriction thereto, and a central axis that is different from the inner winding 106 and the outer winding 104 may be shared.

Embodiment 3

A designer can design various bobbins on the basis of the design principles described in relation to embodiment 1. In embodiment 3, a magnetic device provided with four bobbin members arranged with gaps therebetween is described.

Figure 16:
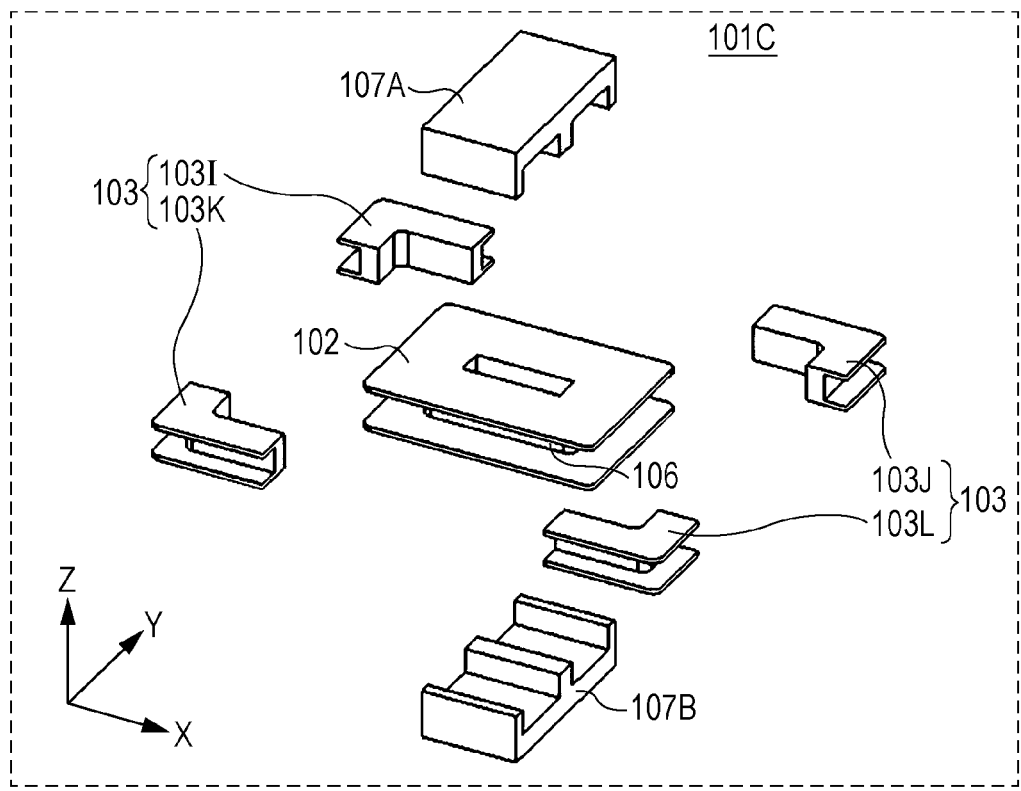
FIG. 16 is an exploded perspective view of a transformer according to embodiment 3.
Figure 17:
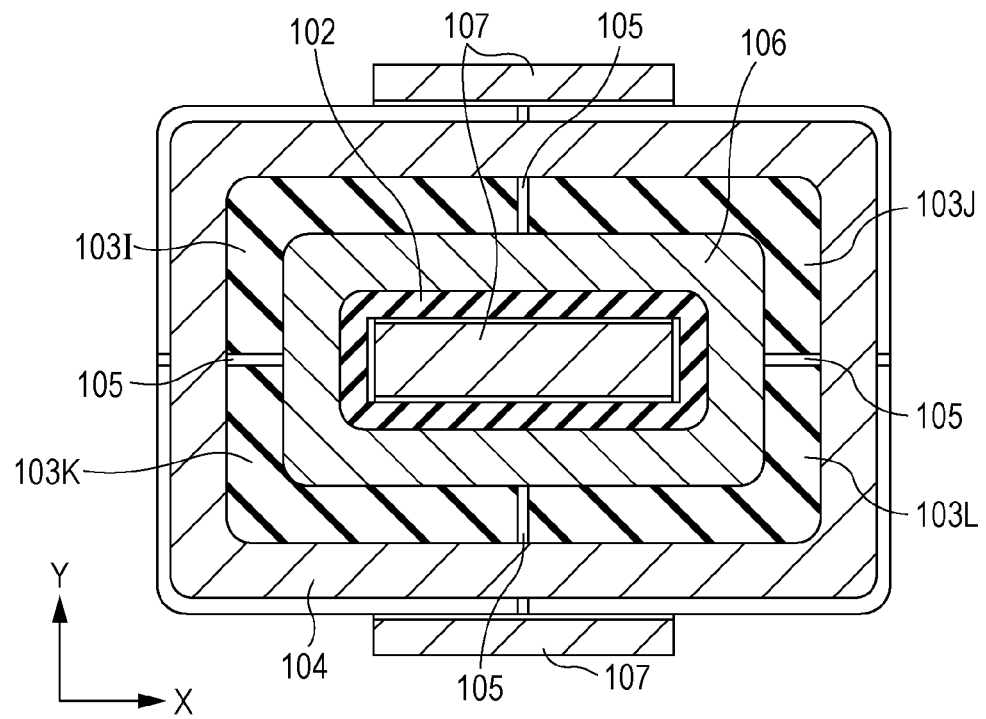
FIG. 17 is a cross-sectional view along a plane perpendicular to the winding axis direction of the transformer according to embodiment 3.

FIG. 16 is an exploded perspective view of a transformer 101C according to embodiment 3. FIG. 17 is a cross-sectional view along an XY plane perpendicular to the winding axis direction of the transformer 101C. It should be noted that a cross-sectional view along a YZ plane that includes the winding axis of the transformer 101C is the same as FIG. 2. The structure of the transformer 101C of embodiment 3 will be described using FIGS. 2, 16, and 17.

The transformer 101C is provided with an inner bobbin 102, an inner winding 106, an outer bobbin 103, an outer winding 104, and a core 107.

The inner bobbin 102 is formed of an insulating resin, for example. The inner bobbin 102 includes an inner column 102A extending in the winding axis direction (i.e., Z direction), an inner upper flange 102B formed at one end of the inner column 102A, and an inner lower flange 102C formed at the other end.

The inner winding 106 is formed of a conductive wire such as a single wire or a litz wire. The inner winding 106 is wound onto the inner bobbin 102. As depicted in FIG. 17, the inner winding 106 is formed with the conductive wire being wound around, in a shape having short areas parallel to the Y direction and long areas parallel to the X direction.

The outer bobbin 103 is formed of an insulating resin, for example. The outer bobbin 103 includes a first bobbin member 103I, a second bobbin member 103J, a third bobbin member 103K, and a fourth bobbin member 103L. The first to fourth bobbin members 103I, 103J, 103K, and 103L are formed in L-shapes when viewed from the Z direction.

One end of the first bobbin member 103I opposes one end of the second bobbin member 103J. The other end of the first bobbin member 103I opposes one end of the third bobbin member 103K. The other end of the second bobbin member 103J opposes one end of the fourth bobbin member 103L. The other end of the third bobbin member 103K opposes the other end of the fourth bobbin member 103L. Gaps 105 are provided between the ends of the bobbin members in the winding direction of the inner winding 106.

The first to fourth bobbin members 103I, 103J, 103K, and 103L each include an outer column 103A extending in the winding axis direction (i.e., Z direction), an outer upper flange 103B formed at one end of the outer column 103A, and an outer lower flange 103C formed at the other end. The outer columns 103A of the first to fourth bobbin members 103I, 103J, 103K, and 103L constitutes a square column by being assembled.

The outer winding 104 is formed of a conductive wire such as a single wire or a litz wire. The outer winding 104 is wound onto the outer bobbin 103.

The core 107 is formed of a magnetic material such as a ferrite, a dust core, or an amorphous alloy. The core 107 includes a core 107A and a core 107B. The core 107A and the core 107B each have the same shape, and are formed in an E-shape when viewed from the X direction. Hereinafter, the core 107A and the core 107B are sometimes collectively referred to as the core 107.

As depicted in FIG. 17, the gap 105 between the first bobbin member 103I and the second bobbin member 103J is located beside a first long area of the inner winding 106; the gap 105 between the third bobbin member 103K and the fourth bobbin member 103L is located beside a second long area of the inner winding 106; the gap 105 between the first bobbin member 103I and the third bobbin member 103K is located beside a first short area of the inner winding 106; and the gap 105 between the second bobbin member 103J and the fourth bobbin member 103L is located beside a second short area of the inner winding 106.

When the transformer 101C is assembled, first, the inner winding 106 is wound onto the inner column 102A of the inner bobbin 102. Next, the outer bobbin 103 is arranged by being made to slide along the XY plane such that the outer column 103A comes into contact with the inner winding 106. Next, the outer winding 104 is wound onto the outer column 103A. Finally, the core 107 is arranged by being made to slide along the ZY plane.

The gaps 105 in the outer bobbin 103 become larger as the inner winding 106 becomes thicker, and the gaps 105 becomes smaller as the inner winding 106 becomes thinner. In either case, L-shaped areas, each including a corner, of the inner winding 106 and the outer bobbin 103 are appropriately in contact. As a result, heat of the inner winding 106 can be suitably transmitted to the outer bobbin 103, and thereby the heat dissipating property of the inner winding 106 can be improved.

It should be noted that, in embodiment 3, the shape described with reference to FIGS. 7 to 10 may be adopted for the shape of the ends of the first to fourth bobbin members 103I, 103J, 103K, and 103L. The same effect can be obtained by means of these shapes. Furthermore, a shape such as that depicted in FIG. 11 may be adopted also for the shape of the transformer 101C in embodiment 3. The same effect can be obtained also with this shape.

As described above, in embodiment 3, the outer bobbin 103 is made up of the four bobbin members 103I, 103J, 103K, and 103L. The contact area between the inner winding 106 and the outer bobbin 103 thereby increases compared to embodiment 1. Therefore, according to embodiment 3, the heat dissipating property can be further improved compared to embodiment 1. Furthermore, the outer bobbin 103 of embodiment 2 is made up of two types of bobbin members; however, the outer bobbin 103 of embodiment 3 may be made up of one type of bobbin member, for example. The types of components can thereby be lessened.

The outer bobbin 103 and L-shaped areas, each including a corner, of the inner winding 106 are in close contact. With this configuration, bending is less likely to occur in the outer bobbin 103 even in the case where winding pressure is applied to the outer bobbin 103 when the outer winding 104 is wound around the outer bobbin 103. Therefore, the possibility of the outer bobbin 103 breaking can be reduced.

The distance between the inner winding 106 and the outer winding 104 is fixed to correspond to the thickness of the outer bobbin 103. It is therefore possible to reduce variation in leakage inductance. Furthermore, a bobbin having a structure same as or similar to the outer bobbin 103 may be additionally arranged outside of the outer winding 104. It is thereby possible to also improve the heat dissipating property of the outer winding 104.

The transformer 101C may not have the core 107.

The core 107 depicted in FIG. 16 is made up of the two E-shaped cores 107A and 107B, but there is no restriction thereto. The core 107 may be made up of four squared U-shaped cores, for example. Alternatively, the core 107 may be made up of an E-shaped core and an I-shaped core.

In the example depicted in FIG. 17, the winding axis of the inner winding 106 and the winding axis of the outer winding 104 are shared, but there is no restriction thereto, and a central axis that is different from the inner winding 106 and the outer winding 104 may be shared.

Embodiment 4

A designer can design various bobbins on the basis of the design principles described in relation to embodiment 1. In embodiment 4, a magnetic device provided with two L-shaped bobbin members arranged with gaps therebetween is described.

Figure 18:
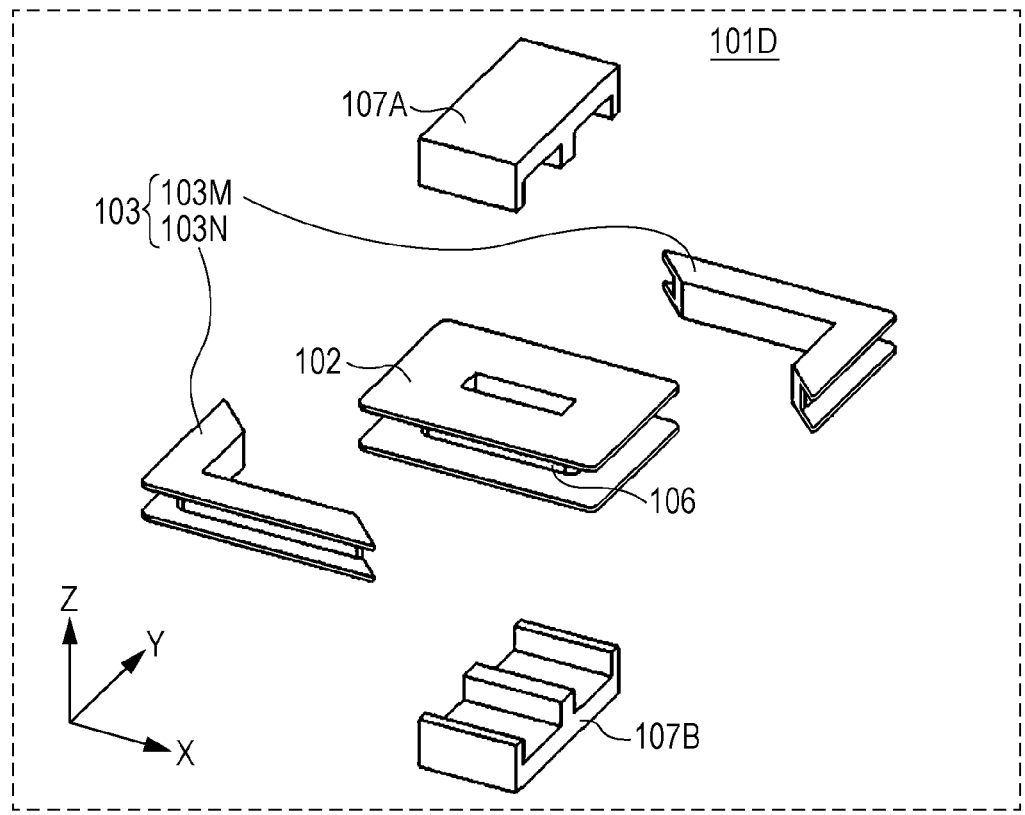
FIG. 18 is an exploded perspective view of a transformer according to embodiment 4.
Figure 19:
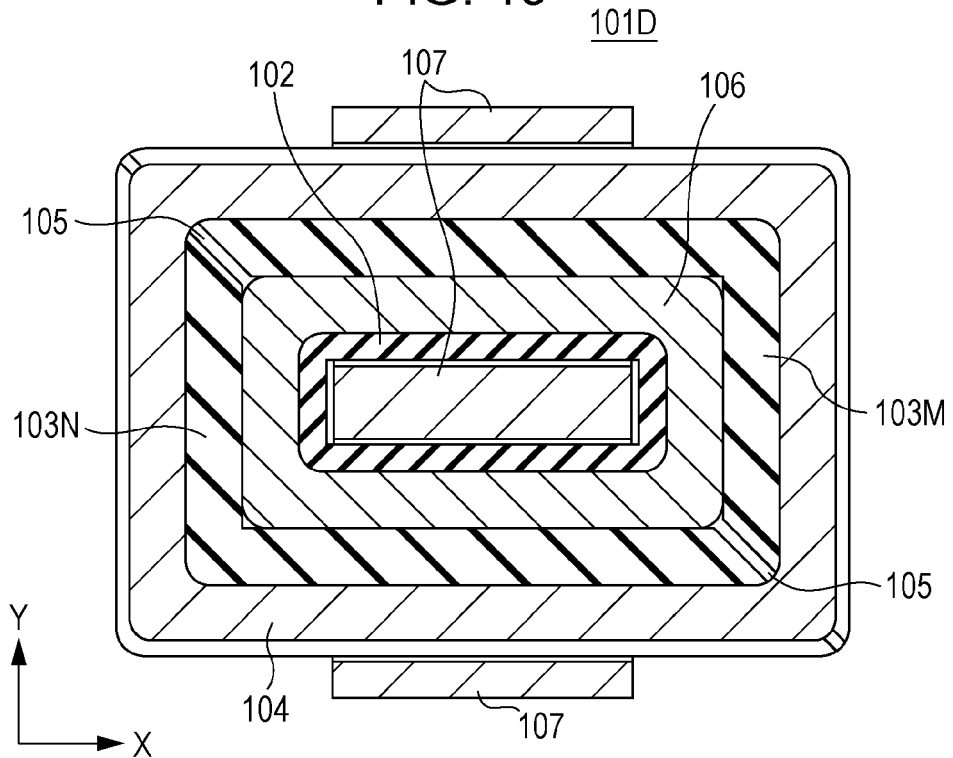
FIG. 19 is a cross-sectional view along a plane perpendicular to the winding axis direction of the transformer according to embodiment 4.

FIG. 18 is an exploded perspective view of a transformer 101D according to embodiment 4. FIG. 19 is a cross-sectional view along an XY plane perpendicular to the winding axis direction of the transformer 101D. It should be noted that a cross-sectional view along a YZ plane that includes the winding axis of the transformer 101D is the same as FIG. 2. The structure of the transformer 101D of embodiment 4 will be described using FIGS. 2, 18, and 19.

The transformer 101D is provided with an inner bobbin 102, an inner winding 106, an outer bobbin 103, an outer winding 104, and a core 107.

The inner bobbin 102 is formed of an insulating resin, for example. The inner bobbin 102 includes an inner column 102A extending in the winding axis direction (i.e., Z direction), an inner upper flange 102B formed at one end of the inner column 102A, and an inner lower flange 102C formed at the other end.

The inner winding 106 is formed of a conductive wire such as a single wire or a litz wire. The inner winding 106 is wound onto the inner bobbin 102. As depicted in FIG. 19, the inner winding 106 is formed with the conductive wire being wound around, in a shape having short areas parallel to the Y direction and long areas parallel to the X direction.

The outer bobbin 103 is formed of an insulating resin, for example. The outer bobbin 103 includes a first bobbin member 103M and a second bobbin member 103N. The first and second bobbin members 103M and 103N have the same shape and are formed in an L-shape when viewed from the Z direction.

One end of the first bobbin member 103M opposes one end of the second bobbin member 103N. The other end of the first bobbin member 103M opposes the other end of the second bobbin member 103N. Gaps 105 are provided between the ends of the bobbin members in the winding direction of the inner winding 106.

The first and second bobbin members 103M and 103N each include an outer column 103A extending in the winding axis direction (i.e., Z direction), an outer upper flange 103B formed at one end of the outer column 103A, and an outer lower flange 103C formed at the other end. The outer columns 103A and 103B constitutes a square column by being assembled.

The outer winding 104 is formed of a conductive wire such as a single wire or a litz wire. The outer winding 104 is wound onto the outer bobbin 103.

The core 107 is formed of a magnetic material such as a ferrite, a dust core, or an amorphous alloy. The core 107 includes a core 107A and a core 107B. The core 107A and the core 107B each have the same shape, and are formed in an E-shape when viewed from the X direction. Hereinafter, the core 107A and the core 107B are sometimes collectively referred to as the core 107.

As depicted in FIG. 19, a first gap 105 is located beside a first corner (e.g., top-left corner) of the inner winding 106, and a second gap 105 is located beside a second corner (e.g., the bottom-right corner) of the inner winding 106. The first and second corners each are located between a long area and a short area of the inner winding 106.

When the transformer 101D is assembled, first, the inner winding 106 is wound onto the inner column 102A of the inner bobbin 102. Next, the outer bobbin 103 is arranged by being made to slide along the XY plane such that the outer column 103A comes into contact with the inner winding 106. Next, the outer winding 104 is wound onto the outer column 103A. Finally, the core 107 is arranged by being made to slide along the ZY plane.

The gaps 105 in the outer bobbin 103 become larger as the inner winding 106 becomes thicker, and the gaps 105 becomes smaller as the inner winding 106 becomes thinner. In either case, the outer bobbin 103 and an L-shaped area from the upper long area of the inner winding 106 to the right-side short area are appropriately in contact, and the outer bobbin 103 and an L-shaped area from the left-side short area of the inner winding 106 to the lower long area are appropriately in contact in FIG. 19. As a result, heat of the inner winding 106 can be suitably transmitted to the outer bobbin 103, and thereby the heat dissipating property of the inner winding 106 can be improved.

It should be noted that, in embodiment 4, the shape described with reference to FIG. 15 may be adopted for the shape of the ends of the first and second bobbin members 103M and 103N. The same effect can be obtained by means of these shapes. Furthermore, the ends of the first and second bobbin members 103M and 103N may have engaging parts 103 such as those described with reference to FIGS. 9 and 10. The same effect can be obtained by means of these shapes. Furthermore, a shape such as that depicted in FIG. 11 may be adopted also for the shape of the transformer 101D in embodiment 4. The same effect can be obtained also with this shape.

As described above, in embodiment 4, the gaps 105 are provided at corners of the outer bobbin 103. In embodiment 4, the contact area between the inner winding 106 and the outer bobbin 103 thereby increases compared to embodiment 1. Therefore, according to embodiment 4, the heat dissipating property can be further improved compared to embodiment 1.

The outer bobbin 103 and linear portions (e.g., long areas and short areas) of the inner winding 106 are in close contact. With this configuration, bending is less likely to occur in the outer bobbin 103 even in the case where winding pressure is applied to the outer bobbin 103 when the outer winding 104 is wound around the outer bobbin 103. Therefore, the possibility of the outer bobbin 103 breaking can be reduced.

The distance between the inner winding 106 and the outer winding 104 is fixed to correspond to the thickness of the outer bobbin 103. It is therefore possible to reduce variation in leakage inductance. Furthermore, a bobbin having a structure same as or similar to the outer bobbin 103 may be additionally arranged outside of the outer winding 104. It is thereby possible to also improve the heat dissipating property of the outer winding 104.

The transformer 101D may not have the core 107.

The core 107 depicted in FIG. 18 is made up of the two E-shaped cores 107A and 107B, but there is no restriction thereto. The core 107 may be made up of four squared U-shaped cores, for example. Alternatively, the core 107 may be made up of an E-shaped core and an I-shaped core.

In the example depicted in FIG. 19, the winding axis of the inner winding 106 and the winding axis of the outer winding 104 are shared, but there is no restriction thereto, and a central axis that is different from the inner winding 106 and the outer winding 104 may be shared.

Embodiment 5

A designer can design various bobbins on the basis of the design principles described in relation to embodiment 1. In embodiment 5, a magnetic device provided with an inner bobbin made up of two bobbin members arranged with gaps therebetween, and an outer bobbin made up of two bobbin members arranged with gaps therebetween is described.

Figure 20:
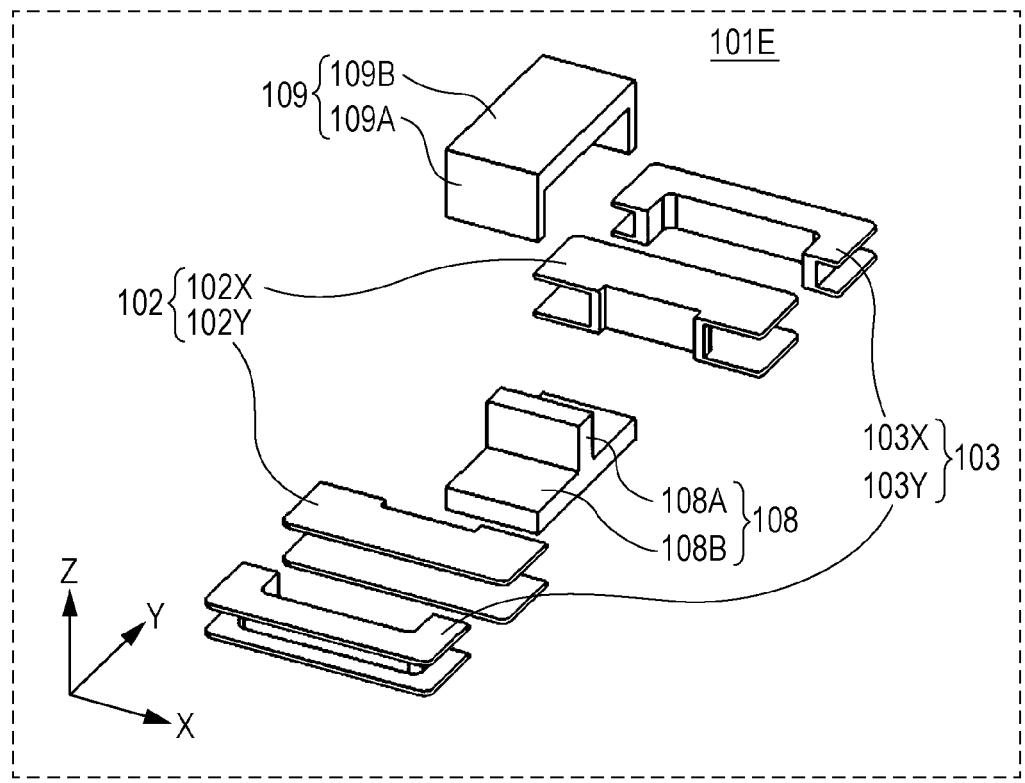
FIG. 20 is an exploded perspective view of a transformer according to embodiment 5.
Figure 21:
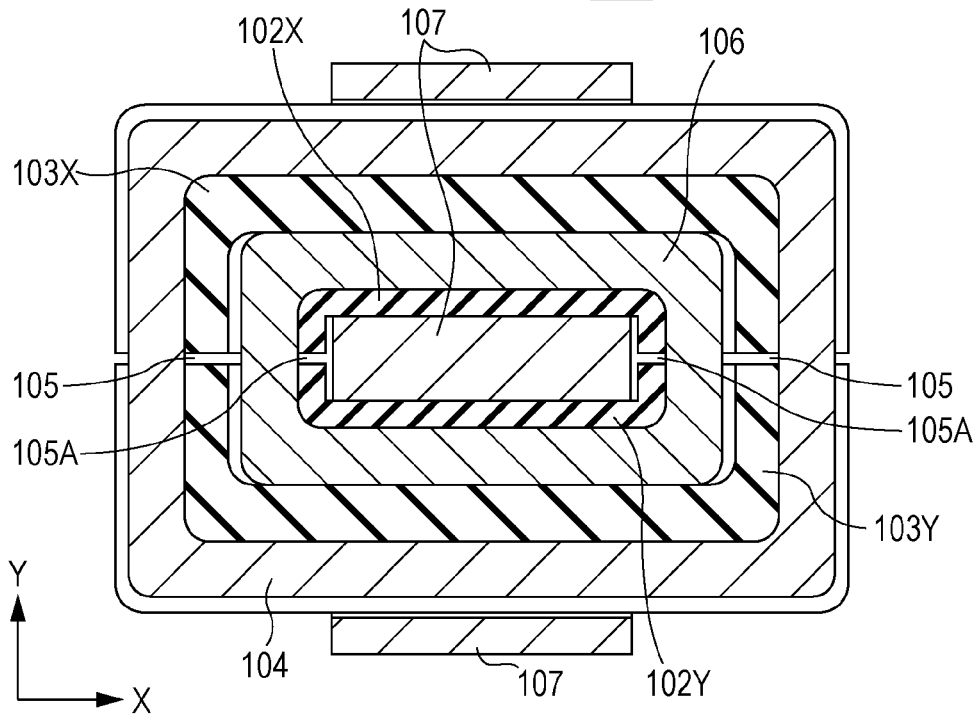
FIG. 21 is a cross-sectional view along a plane perpendicular to the winding axis direction of the transformer according to embodiment 5.

FIG. 20 is an exploded perspective view of a transformer 101E according to embodiment 5. FIG. 21 is a cross-sectional view along an XY plane perpendicular to the winding axis direction of the transformer 101E. It should be noted that a cross-sectional view along a YZ plane that includes the winding axis of the transformer 101E is the same as FIG. 2. The structure of the transformer 101E of embodiment 5 will be described using FIGS. 2, 20, and 21.

The transformer 101E is provided with a core 108, a core 109, an inner bobbin 102, an inner winding 106, an outer bobbin 103, and an outer winding 104.

The core 108 has a column portion 108A and a bottom portion 108B, and is formed in a T-shape when viewed from the X direction. The core 109 has a side portion 109A and a top portion 109B, and is formed in a squared U-shape when viewed from the X direction. The cores 108 and 109 are formed of a magnetic material such as a ferrite, a dust core, or an amorphous alloy. Hereinafter, the core 108 and the core 109 are sometimes collectively referred to as the core 107.

The inner bobbin 102 is formed of an insulating resin, for example. The inner bobbin 102 includes a first bobbin member 102X and a second bobbin member 102Y. The first and second bobbin members 102X and 102Y have the same shape, and are formed in a squared U-shape when viewed from the Z direction.

One end of the first bobbin member 102X opposes one end of the second bobbin member 102Y. The other end of the first bobbin member 102X opposes the other end of the second bobbin member 102Y. Gaps 105A are provided between the ends of the bobbin members in the winding direction of the inner winding 106.

The first and second bobbin members 102X and 102Y each include an inner column 102A extending in the winding axis direction (i.e., Z direction), an inner upper flange 102B formed at one end of the inner column 102A, and an inner lower flange 102C formed at the other end.

The inner winding 106 is formed of a conductive wire such as a single wire or a litz wire. The inner winding 106 is wound onto the inner bobbin 102. As depicted in FIG. 21, the inner winding 106 is formed with the conductive wire being wound around, in a shape having short areas parallel to the Y direction and long areas parallel to the X direction.

The outer bobbin 103 is formed of an insulating resin, for example. The outer bobbin 103 includes a first bobbin member 103X and a second bobbin member 103Y. The first and second bobbin members 103X and 103Y have the same shape, and are formed in a squared U-shape when viewed from the Z direction.

The first and second bobbin members 103X and 103Y each include an outer column 103A extending in the winding axis direction (i.e., Z direction), an outer upper flange 103B formed at one end of the outer column 103A, and an outer lower flange 103C formed at the other end. In other words, the first and second bobbin members 103X and 103Y are formed in the same manner as the first and second bobbin members 103X and 103Y of embodiment 1 depicted in FIGS. 1 to 4.

The outer winding 104 is formed of a conductive wire such as a single wire or a litz wire. The outer winding 104 is wound onto the outer bobbin 103.

As depicted in FIG. 21, the gaps 105A in the inner bobbin 102 are respectively located beside the short areas of the inner winding 106. Furthermore, the gaps 105 in the outer bobbin 103 are respectively located beside the short areas of the inner winding 106.

When the transformer 101E is assembled, first, the inner bobbin 102 is arranged by being made to slide from the Y direction such that the inner column 102A of the inner bobbin 102 comes into contact with the column portion 108A of the core 108. Next, the inner winding 106 is wound onto the inner column 102A of the inner bobbin 102. Next, the outer bobbin 103 is arranged by being made to slide along the XY plane such that the outer column 103A comes into contact with the inner winding 106. Next, the outer winding 104 is wound onto the outer column 103A. Finally, the core 109 is arranged such that the side portion 109A of the core 109 comes into contact with the bottom portion 108B of the core 108 from the Z direction, and the top portion 109B comes into contact with the column portion 108A.

By adjusting the size of the gaps 105A, the inner bobbin 102 can be brought into contact with the core 108 in an appropriate manner even in the case where the size of the first and second bobbin members 102X and 102Y with respect to the core 107 has changed due to manufacturing variations. Consequently, heat of the inner bobbin 102 can be suitably transmitted to the core 108. As a result, heat absorbed from the inner winding 106 by the inner bobbin 102 can be efficiently transmitted, and thereby the heat dissipating property of the inner winding 106 can be improved.

According to embodiment 5, similar to embodiment 1, heat of the inner winding 106 can be suitably transmitted to the outer bobbin 103, and thereby the heat dissipating property of the inner winding 106 can be improved.

It should be noted that the shape described with reference to FIGS. 7 to 10 may be adopted for the shape of the ends of the first and second bobbin members 103X and 103Y in embodiment 5. The same effect can be obtained by means of these shapes. Furthermore, a shape such as that depicted in FIG. 11 may be adopted also for the shape of the transformer 101E in embodiment 5. The same effect can be obtained also with this shape.

The outer bobbin 103 and the linear portions (e.g., the long areas) of the inner winding 106 are in close contact. With this configuration, bending is less likely to occur in the outer bobbin 103 even in the case where winding pressure is applied to the outer bobbin 103 when the outer winding 104 is wound around the outer bobbin 103. Therefore, the possibility of the outer bobbin 103 breaking can be reduced.

The distance between the inner winding 106 and the outer winding 104 is fixed to correspond to the thickness of the outer bobbin 103. It is therefore possible to reduce variation in leakage inductance. Furthermore, a bobbin having a structure same as or similar to the outer bobbin 103 may be additionally arranged outside of the outer winding 104. It is thereby possible to also improve the heat dissipating property of the outer winding 104.

The transformer 101E may not have the core 107.

The T-shaped core 108 and the squared U-shaped core 109 are used in the example depicted in FIG. 20, but there is no restriction thereto.

Figure 22:
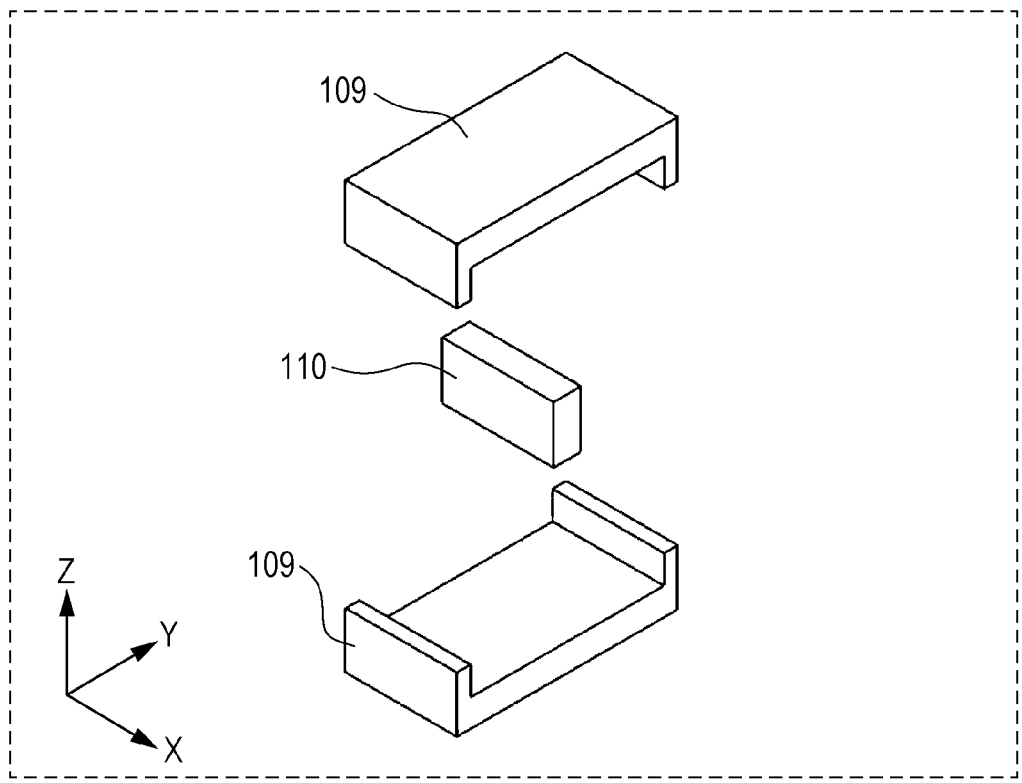
FIG. 22 is a drawing depicting a modified example of the structure of a core according to embodiment 5.
Figure 23:
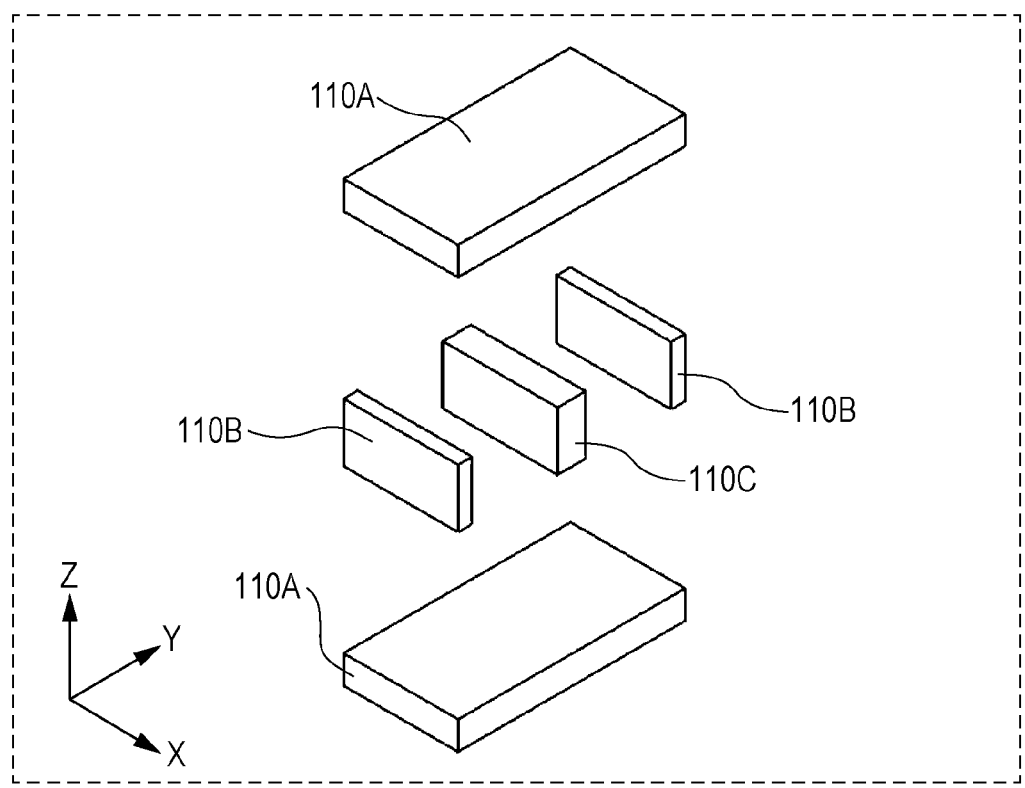
FIG. 23 is a drawing depicting a modified example of the structure of the core according to embodiment 5.

FIGS. 22 and 23 are perspective views schematically depicting other example configurations of the core. FIG. 22 depicts two cores 109 having a squared U-shape when viewed from the X direction, and one core 110 having an I-shape (i.e., a planar plate shape) when viewed from the X direction. As depicted in FIG. 23, two cores 110A, two cores 110B, and one core 110C having an I-shape (i.e., a planar plate shape) when viewed from the X direction may be used.

In the example depicted in FIG. 21, the winding axis of the inner winding 106 and the winding axis of the outer winding 104 are shared, but there is no restriction thereto, and a central axis that is different from the inner winding 106 and the outer winding 104 may be shared.

Figure 24:
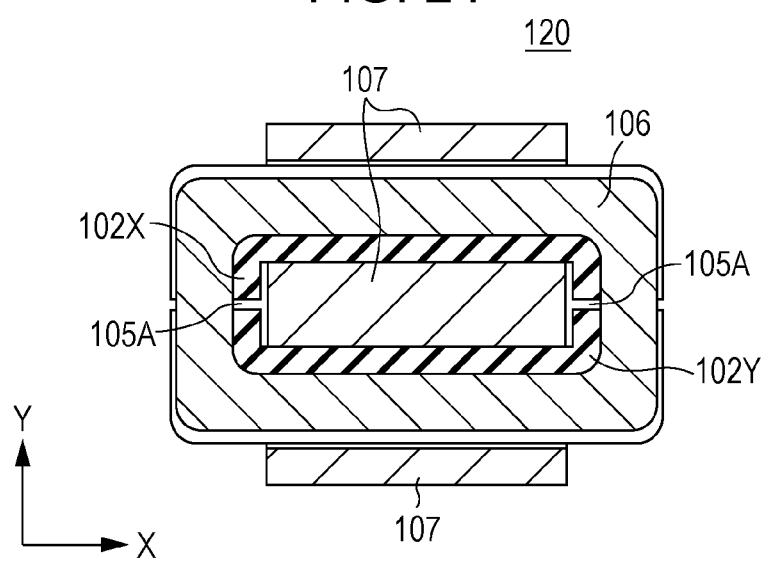
FIG. 24 is a cross-sectional view along a plane perpendicular to the winding axis direction of a coil device according to embodiment 5.

FIG. 24 is a cross-sectional view along an XY plane perpendicular to the winding axis direction of a coil device 120 according to a modified example of embodiment 5. The coil device 120 is provided with an inner bobbin 102, an inner winding 106, and a core 107. The inner bobbin 102 includes a first bobbin member 102X and a second bobbin member 102Y. The inner winding 106 is wound onto the inner bobbin 102 and the core 107 is arranged to thereby configure the coil device 120.

Due to the heat of the inner winding 106 being transmitted to the core 107, the heat dissipating property can be improved even with the coil device 120 in which, as in FIG. 24, an outer winding is not wound. Similarly, various coil devices can be designed by omitting the outer winding from the transformers described in the various aforementioned embodiments. The present disclosure also includes such coil devices.

Embodiment 6

Figure 25:
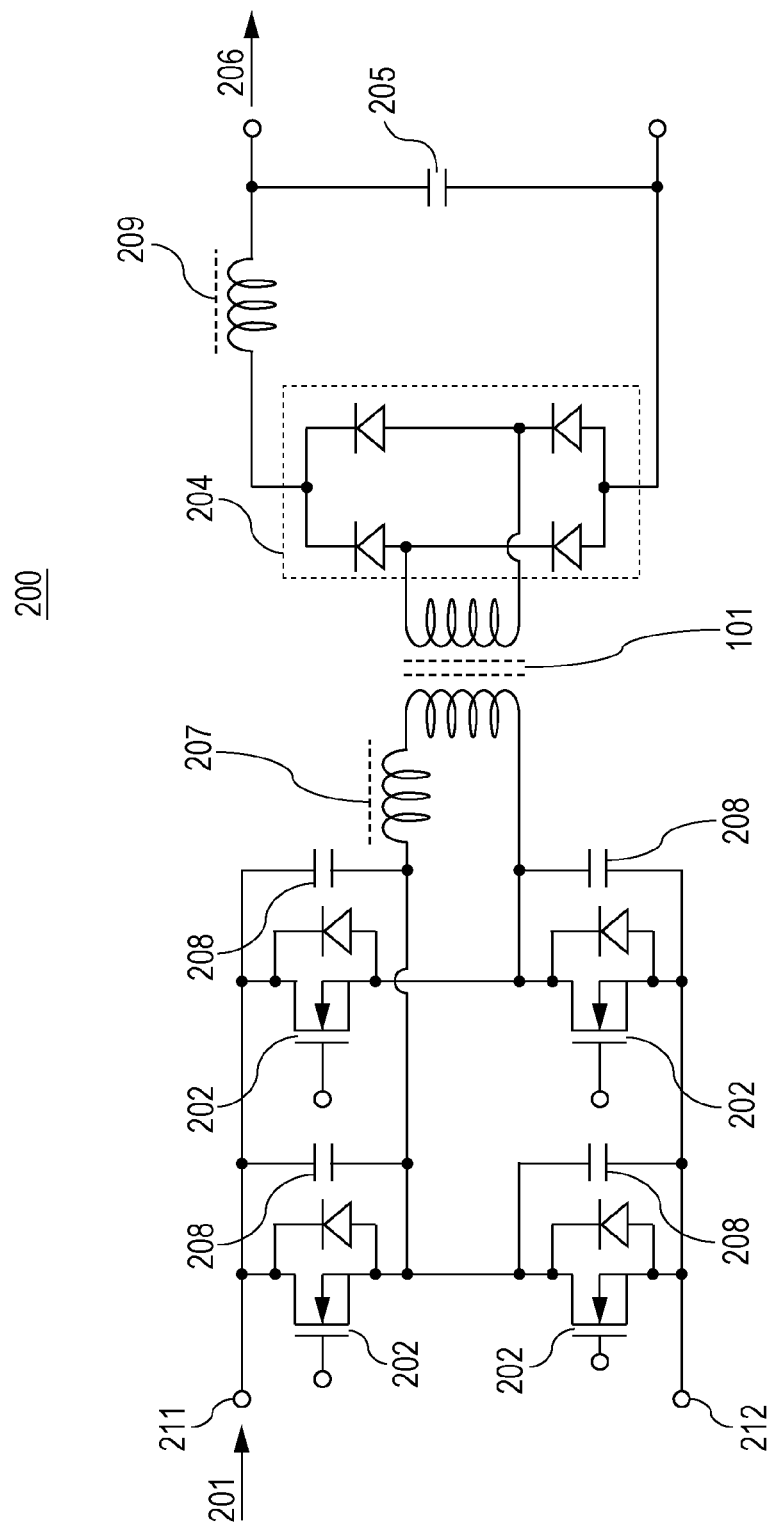
FIG. 25 is a circuit diagram depicting an example of a phase-shift full-bridge circuit.

FIG. 25 is a circuit diagram depicting an example of a phase-shift full-bridge circuit 200. The phase-shift full-bridge circuit 200 of FIG. 25 is widely used as a high-efficiency power source circuit in various switching power sources, and chargers such as an on-board charger, and power converters, for example. The phase-shift full-bridge circuit 200 is an example of a power conversion device.

The phase-shift full-bridge circuit 200 of FIG. 25 is provided with a pair of connection terminals 211 and 212 that are connected to an external direct-current power source, four transistors 202, a transformer 101, a rectification circuit 204, a smoothing inductance 209, and a smoothing capacitor 205. The phase-shift full-bridge circuit 200 is further provided with a resonance inductance 207 and a resonance capacitance 208. The full-bridge circuit, which is made up of the four transistors 202, is an example of a power conversion circuit. The rectification circuit 204 is an example of a power conversion circuit.

The four transistors 202 are connected to a primary winding of the transformer 101. The four transistors 202 have the same configuration. The transistors 202 are metal-oxide film semiconductor field effect transistors (MOSFETs) or insulated-gate bipolar transistors (IGBTs), for example. The transistors 202 are formed of gallium nitride (GaN) or silicon carbide (SiC), for example.

The four transistors 202 are turned on and off alternately such that the top-right and bottom-left transistors 202 are off while the top-left and bottom-right transistors 202 are on, and the top-right and bottom-left transistors 202 are on while the top-left and bottom-right transistors 202 are off, for example. Due to this switching, an alternating-current voltage is obtained from a direct-current voltage 201 that is input to the pair of connection terminals 211 and 212. This alternating-current voltage is input to the primary winding of the transformer 101, and a voltage corresponding to the ratio of the number of turns of the transformer 101 is generated in a secondary winding of the transformer 101. This generated voltage is rectified by the rectification circuit 204 and smoothed by the smoothing inductance 209 and the smoothing capacitor 205, and a direct-current voltage 206 is thereby output.

In the phase-shift full-bridge circuit 200 of FIG. 25, in order to suppress switching loss of the transistors 202, a zero volt switching (ZVS) technique implemented by a resonance circuit of the resonance inductance 207 and the resonance capacitance 208 is used, for example.

For example, in the case where the transformer 101 according to embodiment 1 is adopted as the transformer 101 according to the present embodiment, one from among the inner winding 106 and the outer winding 104 may serve as the primary winding and the other may serve as the secondary winding. Furthermore, in the phase-shift full-bridge circuit 200 of the FIG. 25, any of the transformers 101A to 101E may be used instead of the transformer 101.

The phase-shift full-bridge circuit 200 of FIG. 25 is a power source circuit for a comparatively large amount of power, and therefore a large amount of heat is also generated from the windings of the transformer and a core. Thus, the heat dissipating property can be improved by using the transformers 101 and 101A to 101E. Furthermore, the weight of the circuit can be reduced in the case where the resin molding is omitted or reduced in the transformers 101 and 101A to 101E.

It should be noted that a transformer or a coil device described in the various embodiments may be used for any of a resonance inductance, a transformer, and a smoothing inductance, and the same effect can be thereby obtained.

With regard to the power conversion device according to the present embodiment, the example of the phase-shift full-bridge circuit 200 depicted in FIG. 25 has been described, but there is no restriction thereto.

Figure 26:
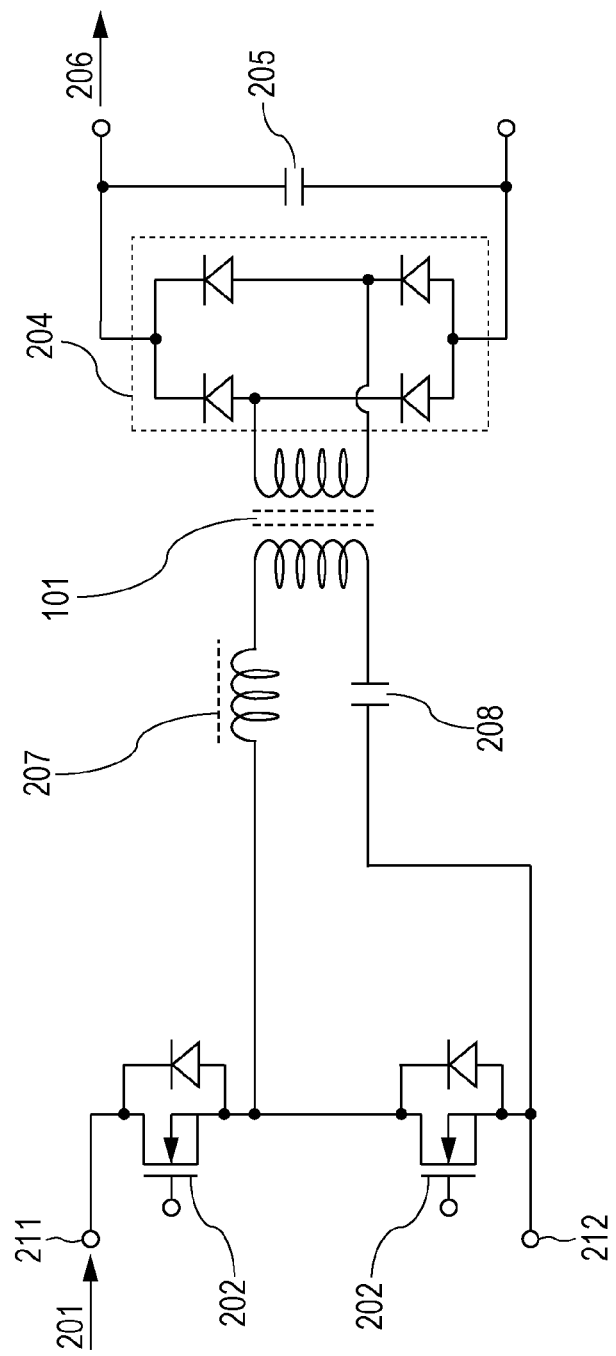
FIG. 26 is a circuit diagram depicting an example of an LLC resonant half-bridge circuit.

FIG. 26 depicts an example of an LLC resonant half-bridge circuit 300. The LLC resonant half-bridge circuit 300 is an example of a power conversion device. For example, the transformer 101 according to embodiment 1 may be adopted as the transformer 101 according to the present embodiment.

A transformer or a coil device described in the various embodiments may be used in an LLC resonant full-bridge circuit for the power conversion device of the present disclosure. Alternatively, a coil device described in the various embodiments may be used in a magnetic device such as reactor or a choke coil.

It should be noted that, in FIGS. 25 and 26, the resonance inductance 207 may be realized by leakage inductance generated by leakage flux that interlinks with only one of the inner winding 106 and the outer winding 104, and may be realized by external inductance. In the case where the resonance inductance 207 is realized with leakage inductance, external inductance is not required, and therefore the size of the circuit can be reduced.

A magnetic device according to the present disclosure or a power conversion device using the magnetic device can be applied in various power source circuits for consumer appliances to on-board chargers, for example.

What is claimed is:
1. A magnetic device comprising:
a winding having a rectangular shape when viewed from an axial direction of the winding; and
combined insulators that form a rectangular shape surrounding four sides of the winding when viewed from the axial direction of the winding,
wherein the combined insulators include:
a first L-shaped insulator being in direct contact with two sides of the rectangular shape of the winding; and
a second L-shaped insulator being in direct contact with two sides of the rectangular shape of the winding, and
the combined insulators have a first gap at a first corner of the rectangular shape of the combined insulators located at a first corner of the rectangular shape of the winding.
2. The magnetic device according to claim 1, wherein
the combined insulators consist of the first L-shaped insulator and the second L-shaped insulator, and
the combined insulators further have a second gap at a second corner located at a second corner of the rectangular shape of the winding, which is diagonal to the first corner, of the rectangular shape of the combined insulators.
3. The magnetic device according to claim 2, wherein
the winding includes:
a pair of first parts extending in a first direction when viewed from the axial direction of the winding; and
a pair of second parts extending in a second direction when viewed from the axial direction of the winding,
each of the first L-shaped insulator and the second L-shaped insulator includes:
a fist portion being in direct contact with one of the first parts of the winding; and
a second portion being in direct contact with one of the second parts of the winding,
the first gap exists between the first portion of the first L-shaped insulator and the second portion of the second L-shaped insulator, and
the second gap exists between the second portion of the first L-shaped insulator and the first portion of the second L-shaped insulator.
4. The magnetic device according to claim 3, wherein
the fist portion is longer than the second portion in each of the first L-shaped insulator and the second L-shaped insulator.
5. The magnetic device according to claim 3, wherein
the second direction is perpendicular to the first direction.
6. The magnetic device according to claim 1, wherein
the first L-shaped insulator and the second L-shaped insulator are in direct contact with a common side of the rectangular shape of the winding,
the combined insulators further include:
an I-shaped insulator being in direct contact with a side, which is opposite to the common side, of the rectangular shape of the winding, and the combined insulators further have a second gap at a second corner, which is adjacent to the first corner, of the rectangular shape of the combined insulators.

7. The magnetic device according to claim 6, wherein the winding includes:
 a pair of first parts extending in a first direction when viewed from the axial direction of the winding; and
 a pair of second parts extending in a second direction when viewed from the axial direction of the winding,
each of the first L-shaped insulator and the second L-shaped insulator includes:
 a fist portion being in direct contact with one of the first parts of the winding; and
 a second portion being in direct contact with one of the second parts of the winding,
the first gap exists between the first portion of the first L-shaped insulator and the I-shaped insulator, and
the second gap exists between the first portion of the second L-shaped insulator and the I-shaped insulator.

8. The magnetic device according to claim 7, wherein the fist portion is longer than the second portion in each of the first L-shaped insulator and the second L-shaped insulator.

9. The magnetic device according to claim 7, wherein the second direction is perpendicular to the first direction.

10. The magnetic device according to claim 1, further comprising:
 another winding outside of the winding,
 the combined insulators being bobbins around which the other winding is wound.

11. The magnetic device according to claim 1, wherein the first gap is larger than 0 mm and equal to or less than 3 mm.

12. A power conversion device comprising:
the magnetic device according to claim 1; and
a power conversion circuit that is connected to the winding.

13. The magnetic device according to claim 1, wherein:
the rectangular shape of the winding includes a first side, a second side, a third side opposite to the first side and a fourth side opposite to the second side,
the first L-shaped insulator is in direct contact with the first and second sides of the rectangular shape of the winding, and
the second L-shaped insulator is in direct contact with the third and fourth sides of the rectangular shape of the winding.

14. The magnetic device according to claim 13, wherein the first corner of the rectangular shape of the winding is located between the first side and the fourth side.

15. The magnetic device according to claim 1, wherein the winding is wound around a single winding axis.

* * * * *